(12) United States Patent
Goo et al.

(10) Patent No.: US 10,705,655 B2
(45) Date of Patent: Jul. 7, 2020

(54) ELECTRONIC DEVICE AND METHOD INCLUDING ELASTIC MEMBER FOR PREVENTING/REDUCING PERFORMANCE DEGRADATION OF PRESSURE SENSOR

(71) Applicant: SAMSUNG ELECTRONICS CO., LTD., Suwon-si, Gyeonggi-do (KR)

(72) Inventors: Ganghyun Goo, Gumi-si (KR); Minsoo Kim, Gumi-si (KR); Jinwan An, Daegu (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 16/173,180

(22) Filed: Oct. 29, 2018

(65) Prior Publication Data
US 2019/0155449 A1 May 23, 2019

(30) Foreign Application Priority Data
Nov. 23, 2017 (KR) .................. 10-2017-0157189

(51) Int. Cl.
*G06F 3/041* (2006.01)
*G01L 1/14* (2006.01)
(Continued)

(52) U.S. Cl.
CPC ............ *G06F 3/0418* (2013.01); *G01L 1/142* (2013.01); *G01L 1/144* (2013.01); *G01L 1/26* (2013.01); *G06F 1/1637* (2013.01); *G06F 3/044* (2013.01); *G06F 3/04817* (2013.01); *G06F 2203/04103* (2013.01); *G06F 2203/04105* (2013.01)

(58) Field of Classification Search
CPC .. G06F 3/0418; G06F 3/0414–3/04146; G06F 2203/04105; G06F 1/1637
See application file for complete search history.

(56) References Cited

U.S. PATENT DOCUMENTS 10,025,417 B2 7/2018 Shin
2006/0293864 A1* 12/2006 Soss ...................... G06F 3/0414
702/104

(Continued)

FOREIGN PATENT DOCUMENTS

EP 3246806 11/2017
KR 10-2015-0088658 8/2015
(Continued)

OTHER PUBLICATIONS

International Search Report dated Feb. 22, 2019 in counterpart International Patent Application No. PCT/KR2018/013110.

*Primary Examiner* — Laurence J Lee
(74) *Attorney, Agent, or Firm* — Nixon & Vanderhye P.C.

(57) ABSTRACT

The present disclosure relates to an electronic device and a method capable of allowing a pressure sensor to accurately sense a pressure value regardless of environmental factors, a change in elasticity of an elastic layer, and a change in an inter-electrode layer gap, wherein the method may include determining, using the pressure sensor, a pressure level while there is no external pressure against the front plate and adjusting at least one threshold level for the electronic device to use when there is an external pressure against the front plate, based at least in part on the determined pressure level.

20 Claims, 26 Drawing Sheets

(51) Int. Cl.
*G06F 3/044*     (2006.01)
*G06F 1/16*      (2006.01)
*G01L 1/26*      (2006.01)
*G06F 3/0481*    (2013.01)

(56) References Cited

U.S. PATENT DOCUMENTS

| | | | |
|---|---|---|---|
| 2011/0260983 A1* | 10/2011 | Pertuit | G06F 3/0414 345/173 |
| 2013/0342501 A1* | 12/2013 | Molne | G06F 3/0414 345/174 |
| 2015/0212549 A1 | 7/2015 | Shin et al. | |
| 2017/0068381 A1 | 3/2017 | Choi et al. | |
| 2017/0083096 A1 | 3/2017 | Rihn et al. | |
| 2017/0285864 A1* | 10/2017 | Pedder | G01L 1/18 |
| 2017/0336970 A1 | 11/2017 | Kim et al. | |
| 2018/0067600 A1* | 3/2018 | Li | G06F 3/0414 |
| 2019/0102031 A1* | 4/2019 | Shutzberg | G06F 3/0414 |

FOREIGN PATENT DOCUMENTS

| | | |
|---|---|---|
| KR | 10-2015-0131469 | 11/2015 |
| KR | 10-2016-0111575 | 9/2016 |
| KR | 10-2017-0030349 | 3/2017 |
| KR | 10-1719577 | 4/2017 |

\* cited by examiner

ELECTRONIC DEVICE AND METHOD INCLUDING ELASTIC MEMBER FOR PREVENTING/REDUCING PERFORMANCE DEGRADATION OF PRESSURE SENSOR

CROSS-REFERENCE TO RELATED APPLICATION

This application is based on and claims priority under 35 U.S.C. § 119 to Korean Patent Application No. 10-2017-0157189, filed on Nov. 23, 2017, in the Korean Intellectual Property Office, the disclosure of which is incorporated by reference herein in its entirety.

BACKGROUND

Field

Various embodiments of the present disclosure are directed to an electronic device and a method capable of allowing a pressure sensor to accurately sense a pressure value, regardless of environmental factors, a change in elasticity of the elastic layer, and a change in an inter-electrode layer gap.

Description of Related Art

With the development of an electronic technology, various types of electronic devices have been developed and widely distributed. In recent years, portable electronic devices having various functions such as smart phones and tablet PCs are becoming popular. In order to support various functions, the portable electronic device has used a means of sensing of strength of a touch input as a new input means. For example, the electronic device may be configured to provide functions associated with applications in response to a pressure touch.

As a size of a display screen of the electronic device is getting larger, display screens (full front, edge-to-edge) arranged over substantially the entire area of a front surface of the electronic device are being developed. In the electronic device, at least some of the existing physically implemented system keys (e.g., a home key, a power key, a volume key, a quick panel) may be implemented in a software manner using a pressure sensor.

The electronic device may include an electrostatic type pressure sensor, a strain gauge type pressure sensor, or a piezo type pressure sensor. The electrostatic type pressure sensor can sense a pressure based on a change in capacitance formed between two electrodes in response to a user's pressure. The capacitance may be increased as a distance between the two electrodes approaches is decreased due to the user's pressure.

However, in the electronic device including the electrostatic type pressure sensor, an adhesive strength of the pressure sensor adhered to a back surface of the display portion may be weakened due to environmental factors such as atmospheric pressure, temperature, humidity, external impact, and the like.

SUMMARY

According to an example aspect of the present disclosure, an electronic device and a method capable of allowing a pressure sensor to accurately sense a pressure value, regardless of environmental factors, a change in elasticity of the elastic layer, and a change in an inter-electrode layer gap is provided.

Example embodiments of the present disclosure are not limited to the above-mentioned example aspects. That is, other aspects that are not mentioned may be understood by those skilled in the art to which the present disclosure pertains from the following description.

Various example embodiments of the present disclosure provide an electronic device, including: a housing including a front plate and a back plate facing a direction opposite the front plate; a display panel interposed between the front plate and the back plate, and exposed through the front plate; a mid-plate interposed between the display panel and the back plate; a pressure sensor including a first conductive plate interposed between the display panel and the mid-plate, and a second conductive plate interposed between the first conductive plate and the mid-plate and spaced from the first conductive plate; an elastic member comprising an elastic material interposed between the second conductive plate and the mid-plate, and attached to the mid-plate; a processor disposed in the housing and electrically connected to the display panel and the pressure sensor; and a memory disposed in the housing and electrically connected to the processor, wherein the memory stores instructions that, when executed by the processor, cause the electronic device to: determine a pressure level using the pressure sensor while there is no external pressure against the front plate; and adjust at least one threshold level for the electronic device to use when there is an external pressure against the front plate, based at least in part on the determined pressure level.

Various example embodiments of the present disclosure provide a method for sensing, by an electronic device, a pressure, the electronic device including a display panel interposed between a front plate and a back plate and exposed through the front plate, a mid-plate interposed between the display panel and the back plate, a pressure sensor including a first conductive plate interposed between the display panel and the mid-plate and a second conductive plate interposed between the first conductive plate and the mid-plate and spaced from the first conductive plate, and an elastic member comprising an elastic material interposed between the second conductive plate and the mid-plate and attached to the mid-plate, the method including: determining a pressure level, using the pressure sensor while there is no external pressure against the front plate; and adjusting at least one threshold level for the electronic device to use when there is an external pressure against the front plate, based at least in part on the determined pressure level.

Various example embodiments of the present disclosure provide a recording medium having recorded thereon a program for controlling an operation of an electronic device, the electronic device including a display panel interposed between a front plate and a back plate and exposed through the front plate, a mid-plate interposed between the display panel and the rear plate, a pressure sensor including a first conductive plate interposed between the display panel and the mid-plate and a second conductive plate interposed between the first conductive plate and the mid-plate and spaced from the first conductive plate, an elastic member comprising an elastic material interposed between the second conductive plate and the mid-plate and attached to the mid-plate, and a processor electrically connected to the display panel and the pressure sensor, wherein the program, when executed by the processor, causes the electronic device to: determine a pressure level, using the pressure sensor while there is no external pressure against the front plate; and adjust at least one threshold level for the electronic device to use when there is an external pressure against the front plate, based at least in part on the determined pressure level.

According to various example embodiments of the present disclosure, it is possible to allow the pressure sensor to accurately sense the pressure value regardless of the environmental factors, the change in elasticity of the elastic layer, and the change in the inter-electrode layer gap.

The effects that may be achieved by the embodiments of the present disclosure are not limited to those mentioned above. That is, other effects that are not mentioned may be understood by those skilled in the art to which the present disclosure pertains from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
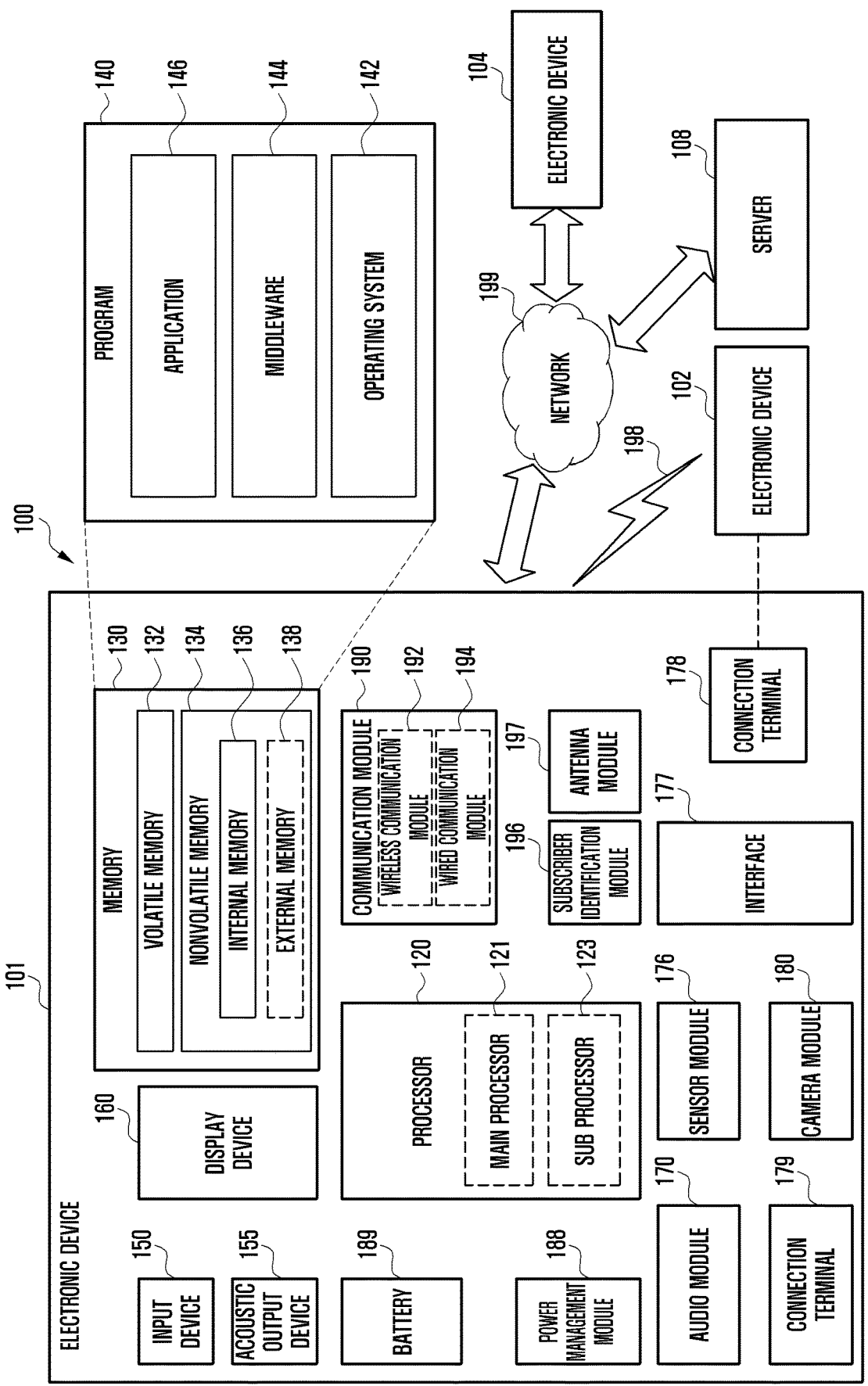
FIG. 1 is a block diagram illustrating an electronic device within network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
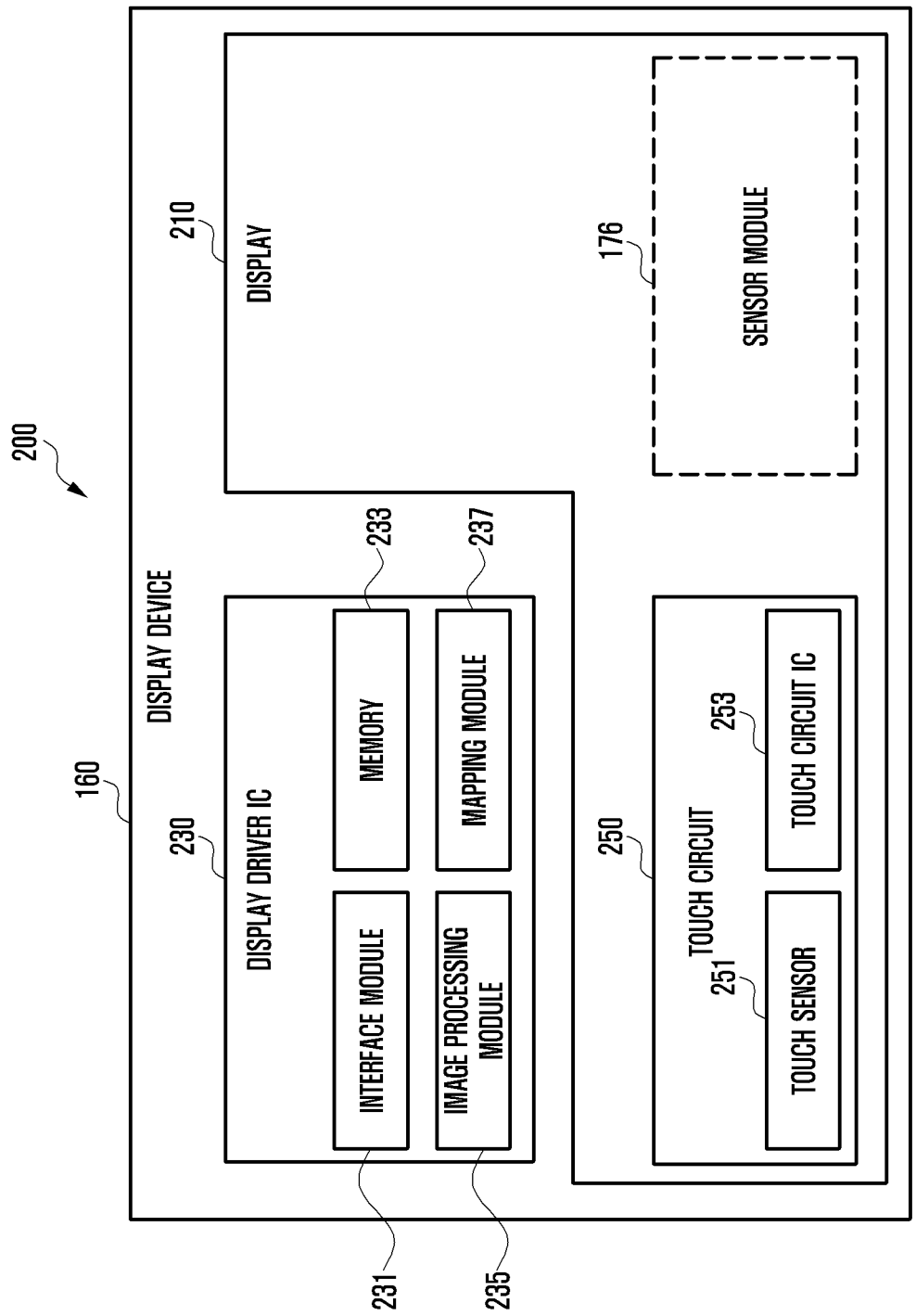
FIG. 2 is a block diagram illustrating a display device according to various embodiments.

FIG. 2 is a block diagram 200 illustrating a display device 160 according to various embodiments. Referring to FIG. 2, the display device 160 may include a display 210 and a display driver IC (DDI) 230 for controlling the same. The DDI 230 may include an interface module (e.g., including circuitry and/or program elements) 231, a memory 233 (e.g., a buffer memory), an image processing module (e.g., including processing circuitry and/or program elements) 235, and/or a mapping module (e.g., including circuitry and/or program elements) 237. The DDI 230 may receive, for example, image data or image information including an image control signal corresponding to a command for controlling the image data from a processor (e.g., a main processor 121 (e.g., application processor) or a sub processor 123 independently operated from the main processor 121) via the interface module 231. The DDI 230 may communicate with a touch circuit 250, a sensor module 176, and the like via the interface module 231. In addition, the DDI 230 may store at least some of the received image information in the memory 233, for example, on a frame-by-frame basis. The image processing module 235 may perform pre-processing or post-processing (e.g., resolution, brightness, or resizing), for example, on at least some of the image data based at least on characteristics of the image data and characteristics of the display 210. The mapping module 237 may convert the pre-processed or post-processed image data into a voltage value or a current value capable of driving pixels through the image processing module 135, based at least on a portion of attributes (for example, array of pixels (RGB stripe or pentile or size of each sub-pixel) of the display 210. At least some of the pixels of the display 210 may be driven on, for example, the voltage value or the current value, so visual information (e.g., text, image, or icon) corresponding to the image data may be displayed on the display 210.

According to an embodiment, the display device 160 may include a touch circuit 250. The touch circuit 250 may include a touch sensor 251 and a touch sensor IC 253 for controlling the touch sensor 251. The touch sensor IC 253 controls the touch sensor 251 to measure a change in a signal (e.g., voltage, light quantity, resistance, or charge amount) with respect to a specific position of the display 210, thereby sensing a touch input or a hovering input for the specific position and providing information (e.g., position, area, pressure, or time) on the sensed touch input or hovering input to the processor 120. According to an embodiment, at least a portion of the touch circuit 250 (e.g., touch sensor IC 253) may be included as a portion of the display driver IC 230 or the display 210 or a portion of other components (e.g., sub processor 123) arranged outside the display device 160.

According to an embodiment, the display device 160 may further include at least one sensor (e.g., fingerprint sensor, iris sensor, pressure sensor or illuminance sensor) of the sensor module 176, or a control circuit for the sensor. In this case, the at least one sensor or the control circuit for the sensor may be embodied in a portion of the display device 160 (e.g., the display 210 or the DDI 230) or a portion of the touch circuit 250. For example, when the sensor module 176 embedded in the display device 160 includes a biometric sensor (for example, fingerprint sensor), the biometric sensor transmits biometric information (e.g., fingerprint image) associated with the touch input through some area of the display 210. As another example, if the sensor module 176 embedded in the display device 160 includes the pressure sensor, the pressure sensor may obtain the pressure information on the touch input through some area or the entire area of the display 210. According to an embodiment, the touch sensor 251 or the sensor module 176 may be disposed between pixels of the pixel layer of the display 210, or above or below the pixel.

The electronic device (e.g., electronic device 700 of FIG. 7) according to various embodiments of the present disclosure includes a housing including a front plate (e.g., front plate 410 of FIG. 4) and a back plate (e.g., back plate 430 of FIG. 4) facing away from (e.g., a direction opposite) the front plate 410, a display panel (e.g., display panel 715 of FIG. 7) interposed between the front plate 410 and the back plate 430 and exposed through the front plate 410, a mid-plate (e.g., mid-plate 711 of FIG. 7) interposed between the display panel 715 and the back plate 430, a pressure sensor (e.g., pressure sensor 717 of FIG. 8) including a first conductive plate (e.g., first conductive plate 831 of FIG. 8) interposed between the display panel 715 and the mid-plate 711 and a second conductive plate (e.g., second conductive plate 833 of FIG. 8) interposed between the first conductive plate 831 and the mid-plate 711 and spaced from the first conductive plate 831, an elastic member (e.g., elastic member 721 of FIG. 8) interposed between the second conductive plate 833 and the mid-plate 711 and attached to the mid-plate 711, a processor (e.g., processor 310 of FIG. 3) located inside the housing and electrically connected to the display panel 715 and the pressure sensor 717, and a memory (e.g., memory 340 of FIG. 3) located inside the housing and electrically connected to the processor, in which the memory stores instructions, which, when executed by the processor, cause the electronic device to: determine a pressure level using the pressure sensor 717 while there is no external pressure against the front plate 410 and adjust at least one threshold value for the electronic device 700 to use based at least in part on the determined pressure level when there is the external pressure against the front plate 410. The pressure sensor 717 may further include an elastic layer 835 interposed between the first conductive plate 831 and the second conductive plate 833. The pressure sensor 717 may further include an adhesive layer interposed between the display panel 715 and the first conductive plate 831. The pressure sensor 717 may further include a flexible printed circuit board (FPCB) interposed between the elastic member 721 and the second conductive plate 833. The pressure sensor may further include a flexible printed circuit board (FPCB) interposed between the adhesive layer and the first conductive plate 831. The FPCB may extend from a portion of the display panel 715. The elastic member may include urethane. When executed, the instructions may cause the electronic device to display at least one graphic user interface (GUI) and select the GUI and/or activate the function associated with the GUI if the external pressure exceeds the at least one threshold value. The GUI may include a button, a symbol, or an icon. The button may include a home button. When executed, the instructions may cause the processor to determine whether the electronic device satisfies a specified condition and if the specified condition is met, determine the pressure level. The specified condition may include a specified period of time during which the user input is not received, a specified time, a specified period, or a connection to a charger. When executed, the instructions may cause the electronic device to: set the pressure level sensed by the pressure sensor 717 to be a reference value while there is no external pressure against the front plate 410, adjust a plurality of threshold values for determining the strength of the front plate 410 as a plurality of pressure levels based on the reference value, determine the pressure level corresponding to the sensed external pressure based on the plurality of adjusted threshold values when the external pressure against the front plate 410 is sensed, and execute the specified function based on the determined pressure level.

In a recording medium on which the program for controlling the operation of the electronic device (e.g., electronic device 700 of FIG. 7) according to various embodiments of the present disclosure is recorded, the electronic device 700 includes the display panel 715 interposed between the front plate 410 and the back plate 430 and exposed through the front plate 410, the mid-plate 711 interposed between the display panel 715 and the back plate 430, the pressure sensor (e.g., pressure sensor 717 of FIG. 8) including the first conductive plate (e.g., first conductive plate 831 of FIG. 8) interposed between the display panel 715 and the mid-plate 711 and a second conductive plate (e.g., second conductive plate 833 of FIG. 8) interposed between the first conductive plate 831 and the mid-plate 711 and spaced from the first conductive plate 831, the elastic member (e.g., elastic member 721 of FIG. 8) interposed between the second conductive plate 833 and the mid-plate 711 and attached to the mid-plate 711, and the processor (e.g., processor 310 of FIG. 3) electrically connected to the display panel 715 and the pressure sensor 717, wherein the program, when executed by the processor 310, causes the electronic device to perform an operation of: determining the pressure level using the pressure sensor 717 while there is no external pressure against the front plate 410 and adjusting at least one threshold value for the electronic device 700 to use based at least in part on the determined pressure level when there is the external pressure against the front plate 410. The recording medium may be further recorded with a program which, when executed by the processor, causes the electronic device to perform an operation of displaying at least one graphic user interface (GUI) and selecting the GUI and/or activate the function associated with the GUI if the external pressure exceeds the at least one threshold value.

Figure 3:
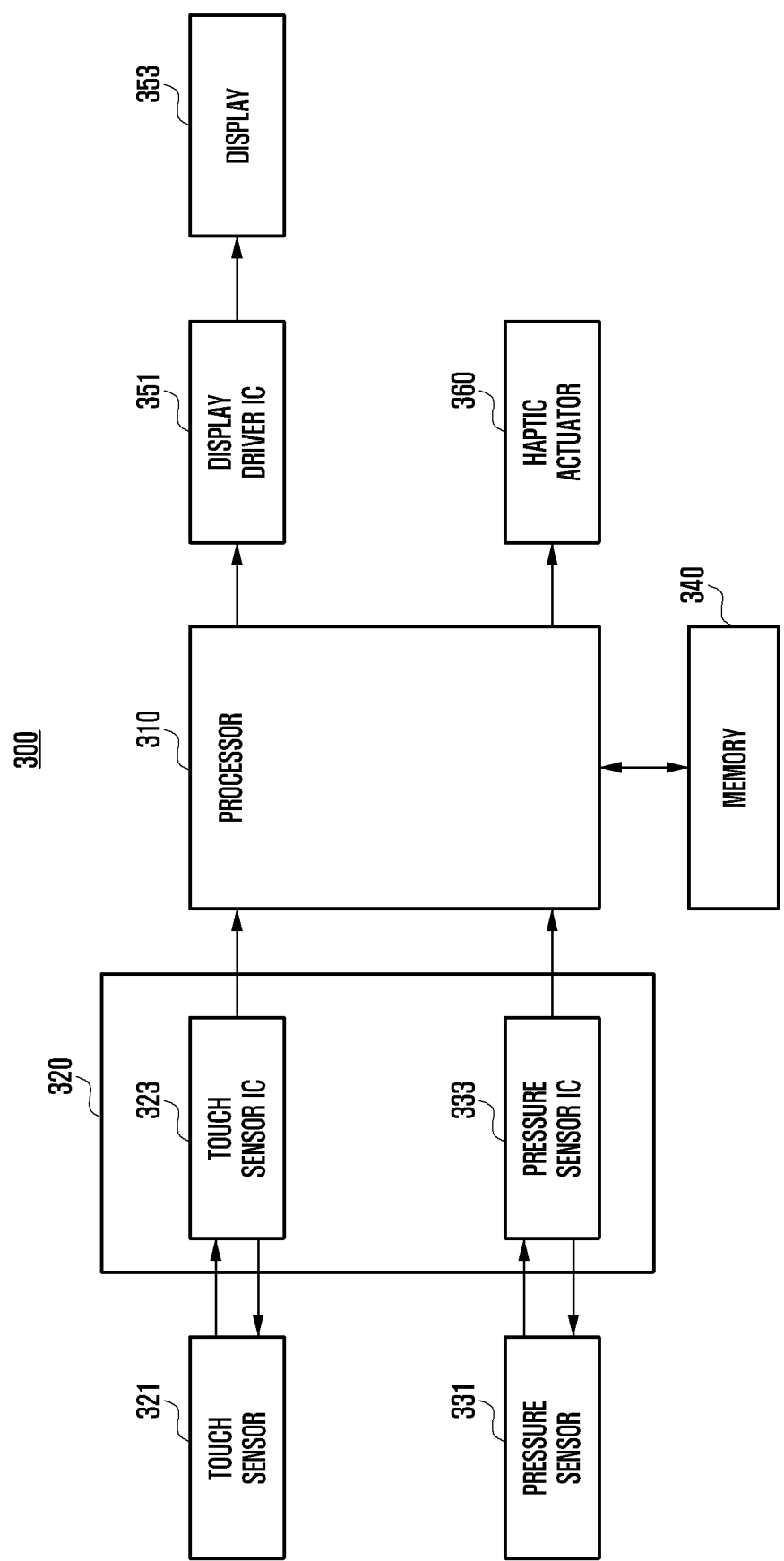
FIG. 3 is a block diagram illustrating a configuration of an electronic device according to an embodiment of the present disclosure.

FIG. 3 is a block diagram illustrating a configuration of an electronic device 300 according to an embodiment of the present disclosure.

Referring to FIG. 3, the electronic device 300 (e.g., electronic device 101 of FIG. 1) according to an embodiment includes the processor (e.g., including processing circuitry) 310 (e.g., processor 120 of FIG. 1), the memory 340 (e.g., memory 130 of FIG. 1), a touch sensor (e.g., including touch sensing circuitry) 321 (e.g., touch sensor 251 of FIG. 2), a touch sensor IC 323 (e.g., touch circuit IC 253 of FIG. 2), a pressure sensor 331, a pressure sensor IC 333, a display 353 (e.g., display 210 of FIG. 2), a display driver IC 351, and/or a haptic actuator (e.g., including haptic actuating circuitry) 360.

According to an embodiment, the processor 310 may include various processing circuitry and execute an application (e.g., application 146 of FIG. 1) and control at least one component of the electronic device 300 (e.g., electronic device 101 of FIG. 1) based on the executed application (e.g., application 146 of FIG. 1). For example, the processor 310 may execute an application (e.g., application 146 of FIG. 1), and may control at least one of the memory 340, the touch sensor 321, the touch sensor IC 323, the pressure sensor 331, the pressure sensor IC 333, the display 353, the display driver IC 351, and the haptic actuator 360 based on the executed application (e.g., application 146 of FIG. 1).

According to an embodiment, the processor 310 may set a user input possible area (touchable area, a pressure possible area, and the like) that the touch sensor IC 323 and/or the pressure sensor IC 333 can recognize, and transmit the set user input possible area to the touch sensor IC 323 and/or the pressure sensor IC 333. According to an embodiment, a position of the user input possible area can be changed. For example, the processor 310 may transmit the position of the changed user input possible area to the touch sensor IC 323 and/or the pressure sensor IC 333. According to an embodiment, the processor 310 may determine the image information to be transmitted to the display driver IC 351, the position of the image information, and/or the haptic information to be transmitted to the haptic actuator 360. For example, if the strength of the received touch pressure is equal to or greater than a first threshold value, the processor 310 may transmit the first image information to the display driver IC 351, and transmit the first haptic information to the haptic actuator 360. For example, if the strength of the received touch pressure is equal to or greater than a second threshold value greater than the first threshold value, the processor 310 may transmit the second image information (e.g., image information in which at least some of the first image information is enlarged) to the display driver IC 351, and transmit the second haptic information (e.g., stronger haptic information than the first haptic information) to the haptic actuator 360. According to an embodiment, the processor 310 may map the strength of the first pressure to a first position of the touch input received at a first time, and may map the strength of the second pressure to a second position of the touch input received at a second time different from the first time. According to an embodiment, the processor 310 may transmit the mapped information to each module (e.g., memory 340, touch sensor 321, touch sensor IC 323, pressure sensor 331, pressure sensor IC 333, display 353, display driver IC 351, or haptic actuator 360), and then may be switched to an inactive state. According to an embodiment, the processor 310 may be in an inactive state in an always on display (AOD) mode. For example, the processor 310 may maintain the inactive state in the AOD mode, and may be activated only while transmitting and receiving the image information and/or the control signal or the sensing signal to and from the display driver IC 351, and the touch sensor IC 323, and switched to the inactive state if the transmission and reception operation is completed. The AOD mode may allow the display 353 to activate only at least some area based on the control of the processor 310 to display the specified information through the at least some area, and may be in a state of being operated in a low power mode to reduce power consumption of components (e.g., touch sensor 321, touch sensor IC 323, pressure sensor 331, pressure sensor IC 333, display 353, display driver IC 351, or haptic actuator 360) of the electronic device 300 including the processor 310. According to an embodiment, the haptic actuator 360 may be operated in the low power mode and may directly receive a signal from the touch sensor IC 323 or the pressure sensor IC 333 in the state in which the processor 310 wakes up and quickly provide the haptic feedback without delay.

According to an embodiment, the touch sensor IC 323 may transmit or receive a signal (transmit signal TX, receive signal RX) to or from the touch sensor 321. According to an embodiment, the touch sensor IC 323 may sense the touch input position based on the signal transmitted or received to the touch sensor 321. According to an embodiment, the touch sensor IC 323 may transmit the sensed touch input position to the processor 310. According to an embodiment, the touch sensor IC 323 may transmit or receive a signal to or from the touch sensor 321 only in some area of the touch sensor 321 specified by the processor 310 in advance. The touch sensor IC 323 may transmit or receive a signal to or from the touch sensor 321 over the entire area of the touch sensor 321, and may transmit the touch input position to the processor 310 when the touch input position is at some area of the touch sensor 321 specified by the processor 310 in advance and may not transmit the touch input position to the processor 310 when the touch input position is not at some area of the touch sensor 321 specified by the processor 310 in advance. According to an embodiment, the touch sensor IC 323 may be operated in the normal mode and/or the low power mode under the control of the processor 310. The low power mode may be an operation mode for reducing power consumption of the touch sensor 321 and the touch sensor IC 323 as compared to the normal mode. For example, if the touch sensor IC 323 is in the low power mode, the touch sensor IC 323 may be operated at the touch sensing frequency and/or the touch scan period lower than the normal mode.

According to an embodiment, the touch sensor IC 333 may transmit or receive a signal (transmit signal TX, receive signal RX, stimulus signal (shield) or the like) to or from the pressure sensor 331. According to an embodiment, the pressure sensor IC 333 may transmit the sensed strength (pressure) of the touch input and/or a holding time of the pressure to the processor 310. According to an embodiment, the processor 310 may determine the strength (pressure) of the user's touch input and/or the holding time of the pressure based on the signal received from the pressure sensor IC 333. According to an embodiment, the pressure sensor IC 333 may transmit or receive a signal to or from the pressure sensor 331 only in some area of the pressure sensor 331 specified by the processor 310 in advance. The pressure sensor IC 333 may transmit or receive a signal to or from the pressure sensor 331 over the entire area of the pressure sensor 331, and may transmit the pressure input position to the processor 310 when the pressure input position is at some area of the pressure sensor 331 specified by the processor 310 in advance and may not transmit the pressure input position to the processor 310 when the pressure input position is not at some area of the pressure sensor 331 specified by the processor 310 in advance. According to an embodiment, the pressure sensor IC 333 may be operated in the normal mode and/or the low power mode. The low power mode may be an operation mode for reducing power consumption of the pressure sensor 331 and the pressure sensor IC 333 as compared to the normal mode. For example, if the pressure sensor IC 333 is in the low power mode, the power sensor IC 323 may be operated at the power sensing frequency and/or the power scan period lower than the normal mode. According to an embodiment, the display 353 may be configured separately from the touch sensor 321 or the pressure sensor 331. The touch sensor 353 may include any one of the touch sensor 321 and the pressure sensor 331. According to various example embodiments, the touch sensor 321 and the pressure sensor 331 may be separately configured from each other or may be integrally configured. For example, the touch sensor 321 and the pressure sensor 331 may be integrated to configure one IC 320, or any one of the touch sensor 321 and the pressure sensor 331 may include another IC 320.

According to an embodiment, the display driver IC 351 may transmit a drive signal (e.g., data signal, gate drive signal, etc.) to the display 353 based on the image information received from the processor 310.

According to an embodiment, the memory 340 may store instructions or data that allow the processor 310 to perform the operations and may include a volatile memory (e.g., volatile memory 132 of FIG. 1) or a non-volatile memory (e.g., non-volatile memory 134 of FIG. 1).

Figure 4:
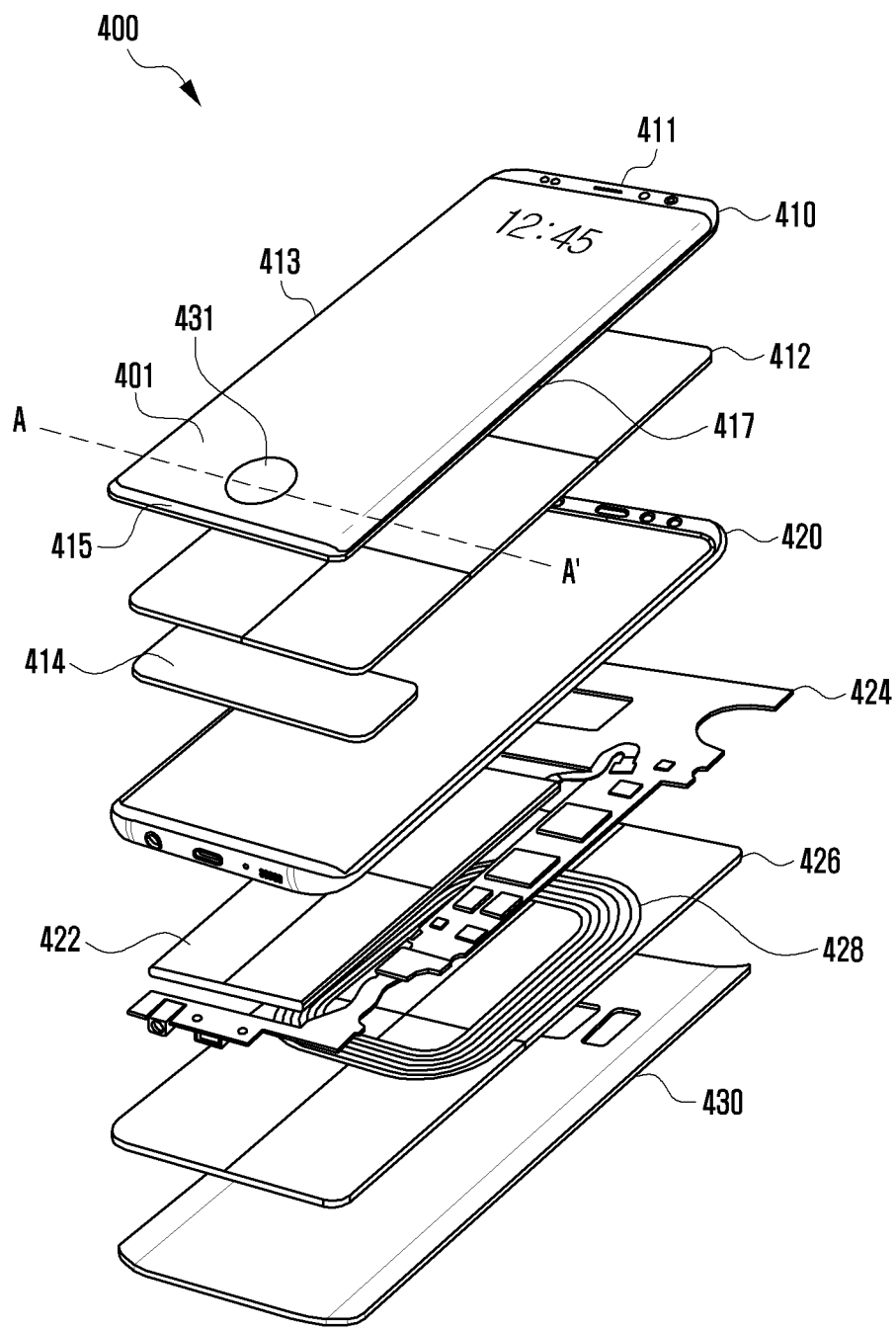
FIG. 4 is an exploded front perspective view illustrating the configuration of the electronic device according to various embodiments of the present disclosure.
Figure 5:
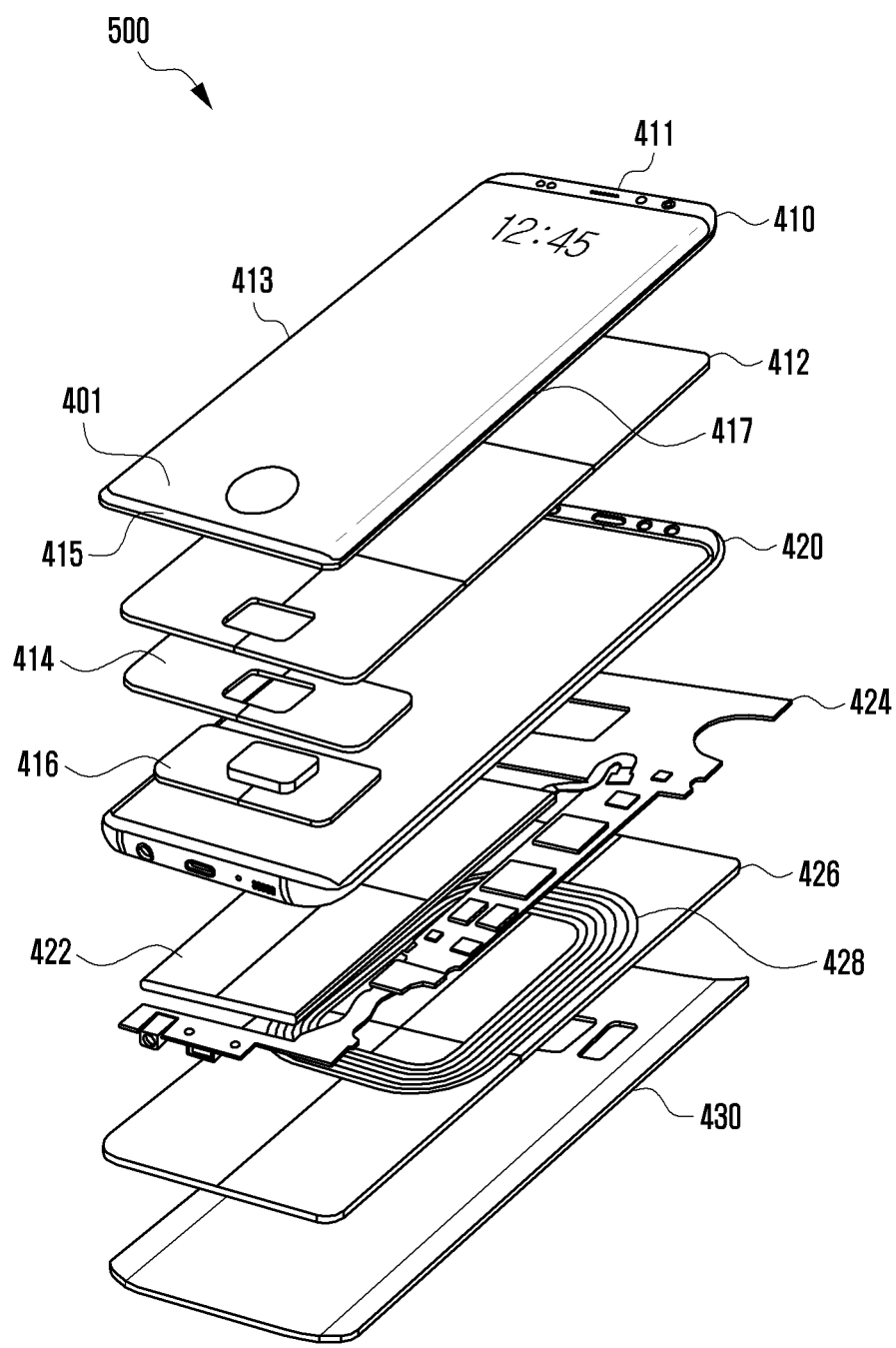
FIG. 5 is an exploded front perspective view illustrating a configuration of an electronic device according to another embodiment of the present disclosure.

FIG. 4 is a diagram illustrating a configuration of an electronic device 400 according to various embodiments of the present disclosure. FIG. 5 is a diagram illustrating a configuration of an electronic device 500 according to another embodiment of the present disclosure.

Referring to FIG. 4, the electronic device 400 (e.g., electronic device 101 of FIG. 1 or electronic device 300 of FIG. 3) according to various embodiments of the present disclosure may include housings 410, 420, and 430 which include a front plate 410, a mid-plate 420, and a back plate 430, a digitizer panel 412, a pressure sensor panel 414, a battery 422, a PCB 424, an FPCB 426, and/or a wireless charging coil 428.

According to various embodiments, the front plate 410, the digitizer panel 412, the pressure sensor panel 414, and a biometric sensor 416 (see FIG. 5) (e.g. fingerprint sensor) may be positioned above the mid-plate 420. The battery 422, the PCB 424, the FPCB 426, the wireless charging coil 428, and the back plate 430 may be located under the mid-plate 420. According to an embodiment, the electronic device 400 may omit at least one of the above-described components, or may further include other components. According to an embodiment, the electronic device 400 may use the outside exposed surface of the housing 410, 420, 430 as at least a portion of the antenna. According to various embodiments, the electronic device 400 may include at least some of the electronic devices 101, 102, and 104 of FIG. 1.

According to an embodiment, the front plate 410 may be a cover forming the front surface of the electronic device 400. The front plate 410 may have a rectangular shape when viewed from the top. According to an embodiment, the front plate 410 includes a first peripheral portion 411 having a first length and extending in a first direction, a second peripheral portion 413 having a second length greater than the first length and substantially perpendicular to a first direction, a third peripheral portion 415 having a first length and extending parallel to the first peripheral portion, and a fourth peripheral portion 417 having a second length and extending parallel to the second peripheral portion. According to an embodiment, the front plate 410 may include a window (window cover or cover window) that exposes the touch screen display 401 through at least a part thereof.

According to an embodiment, the touch screen display 401 may display an image. For example, the touch screen display 401 may perform an input function and a display function. According to an embodiment, the touch screen display 401 may include a touch panel (not shown) and a display (not shown). According to an embodiment, the touch panel may be disposed above the display. For example, the touch panel may be interposed between the front plate 410 and the display.

According to various embodiments, the touch screen display 401 may include the display device 160 of FIG. 1.

According to an embodiment, the digitizer panel 412 may receive an X coordinate and a Y coordinate for a user touch that is input through the touch screen display 401.

According to an embodiment, the pressure sensor panel 414 may sense the touch pressure input through the touch screen display 401 and the digitizer panel 412. According to an embodiment, the pressure sensor panel 414 may replace a home key 431 of the electronic device 400.

According to an embodiment, the housings 410, 420, and 430 may include side members (not shown) that house components within the electronic device 400 described above. According to an embodiment, at least a portion of the outside exposed surface of the side member may be made of a conductive material (e.g., metal). According to an embodiment, the side members of the housings 410, 420, and 430 may be used as the antenna of the electronic device 400. The side member may be configured to include an antenna (e.g., an inverted-f antenna (IFA)) having a length of λ/4. According to an embodiment, the housings 410, 420, and 430 may surround a space between the front plate 410 and the back plate 430 through the side members when the front plate 410 and the back plate 430 are stacked.

According to an embodiment, the battery 422 may supply power required to drive the electronic device 400. According to various embodiments, the battery 422 may include the battery 189 of FIG. 1.

According to an embodiment, the printed circuit board (PCB) 424 may include a processor (e.g., processor 120 of FIG. 1), a memory (e.g., memory 130 of FIG. 1), a communication module (e.g., communication module 190 of FIG. 1), and a power management module (e.g., power management module 188 of FIG. 1). The PCB 424 may include a printed board assembly (PBA), a flexible printed board assembly (FPCB) and the like which are formed with various kinds of connectors such as a battery contact. The communication module (e.g., communication module 190 of FIG. 1) may include a wireless communication circuit of the electronic device 400. The wireless communication circuit may be electrically connected to a processor (e.g., processor 120 of FIG. 1). At least a portion of the side members of the housings 410, 420, 430 may be connected to at least a portion of the wireless communication circuit.

According to an embodiment, the FPCB 426 may include a wireless charging coil 428 for charging the battery 422 wirelessly, and a coil antenna for near field communication such as near field communication (NFC) or magnetic secure transmission (MST). According to various embodiments, the FPCB 426 may include the wireless charging module.

The back plate 430 may be a cover forming a back surface of the electronic device 400. The back plate 430 may be disposed facing away (a direction opposite) from the front plate 410. The back plate 430 may be disposed at an opposite side to the front plate 410 and may face the front plate 410.

According to an embodiment, the electronic device 400 may include the biometric sensor 416 (e.g., fingerprint sensor). The biometric sensor 416 may be configured to perform user authentication based on the biometric information of a user. For example, the electronic device 400 may receive fingerprint information of a user through the biometric sensor 416 and perform the user authentication based on the received fingerprint information. According to an embodiment, the biometric sensor 416 may include at least a portion of the sensor module 176 of FIG. 1. According to an embodiment, although not shown in FIG. 4, when the biometric sensor 416 is a fingerprint sensor, the fingerprint sensor is disposed to face the back plate 430 to receive the biometric information of the user through the back direction of the electronic device 400. Another example, as shown in FIG. 5, in the electronic device 500 (e.g., electronic device 101 of FIG. 1, or electronic device 300 of FIG. 3) according to another embodiment, the fingerprint sensor 416 may be interposed between the pressure sensor panel 414 and the mid-plate 420 and the fingerprint sensor is disposed to face the front plate 410 to receive the biometric information of the user through the front direction of the electronic device 500.

Figure 6:
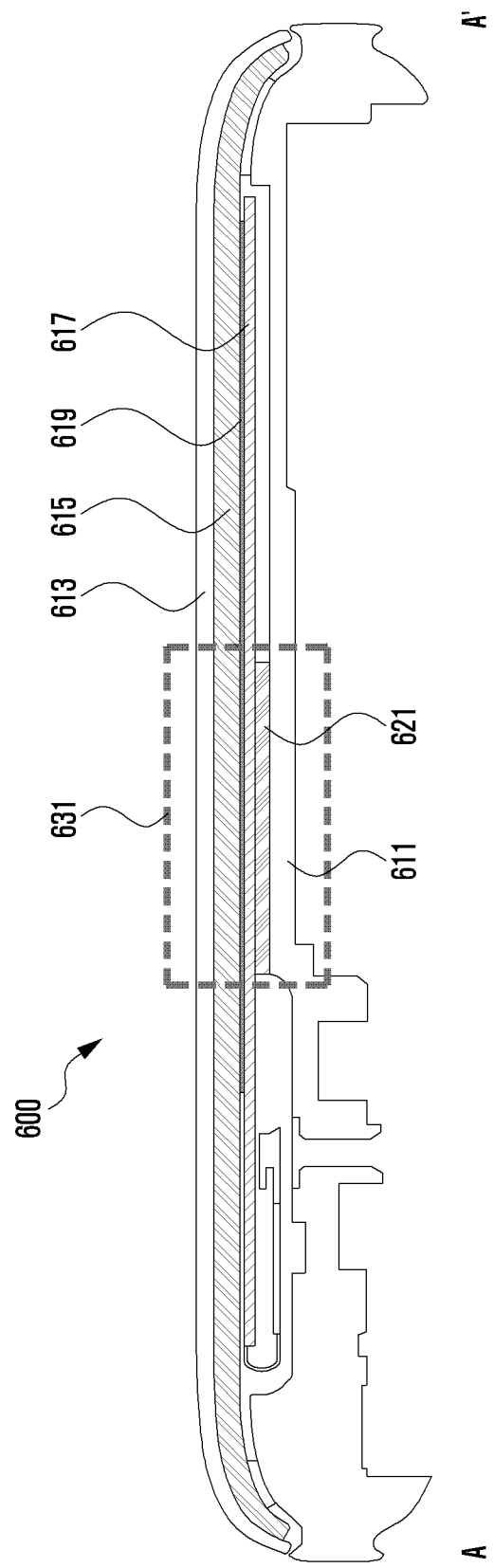
FIG. 6 is a cross-sectional view illustrating a portion of the electronic device according to various embodiments of the present disclosure.

FIG. 6 is a cross-sectional view illustrating a portion of the electronic device according to various embodiments of the present disclosure. For example, FIG. 6 may be a cross-sectional view of the electronic device 400 taken along the line A-A' illustrated in FIG. 4

Referring to FIG. 6, the electronic device 600 (e.g., electronic device 101 of FIG. 1 or electronic device 300 of FIG. 3) according to an embodiment includes a display panel 615 which is interposed between a window 613 of a front plate (e.g., front plate 410 of FIG. 4) and a back plate (e.g., back plate 430 of FIG. 4) and exposed through the window 613, a mid-plate 611 (e.g., mid-plate 420 of FIG. 4) interposed between the display panel 615 and the back plate, and a pressure sensor 617 which is interposed between the display panel 615 and the mid-plate 611 and is attached to the display panel 615 by an adhesive layer 619.

According to an embodiment, the pressure sensor 617 may be disposed at a lower part when viewing a portion of the electronic device 600, for example, the front surface of the electronic device 600 from the top. For example, the pressure sensor 617 may be disposed to correspond to a plurality of buttons, for example, a first button (e.g., home button), a second button (e.g., a back button), a third button (e.g., setting button), an icon or the like, which are implemented in a software manner, through the lower part of the display panel 615. According to an embodiment, the pressure sensor 617 may include a plurality of channels that are independent of one another to correspond to each of the at least one button.

According to an embodiment, the electronic device 600 may determine that the plurality of buttons are selected and/or may activate the functions associated with the plurality of buttons if the pressure sensor 617 senses an external pressure exceeding the threshold value.

According to an embodiment, an elastic member 621 may be configured to allow the pressure sensor 617 to sense a minimum pressure value even if the environmental factors, the change in elasticity of the elastic layer, or the change in the inter-electrode layer gap occur. According to an embodiment, the elastic member 621 of the pressure sensor 617 may include an elastic member comprising an elastic material. According to an embodiment, the elastic member 621 of the pressure sensor 617 may include, for example, and without limitation, a urethane material, specifically PORON™. According to an embodiment, the elastic member 621 may be disposed to correspond to a portion of the pressure sensor 617. For example, the elastic member 621 may be disposed to overlap an intermediate portion 631 of the pressure sensor 617 where the home button of the electronic device 600 is positioned.

Figure 7:
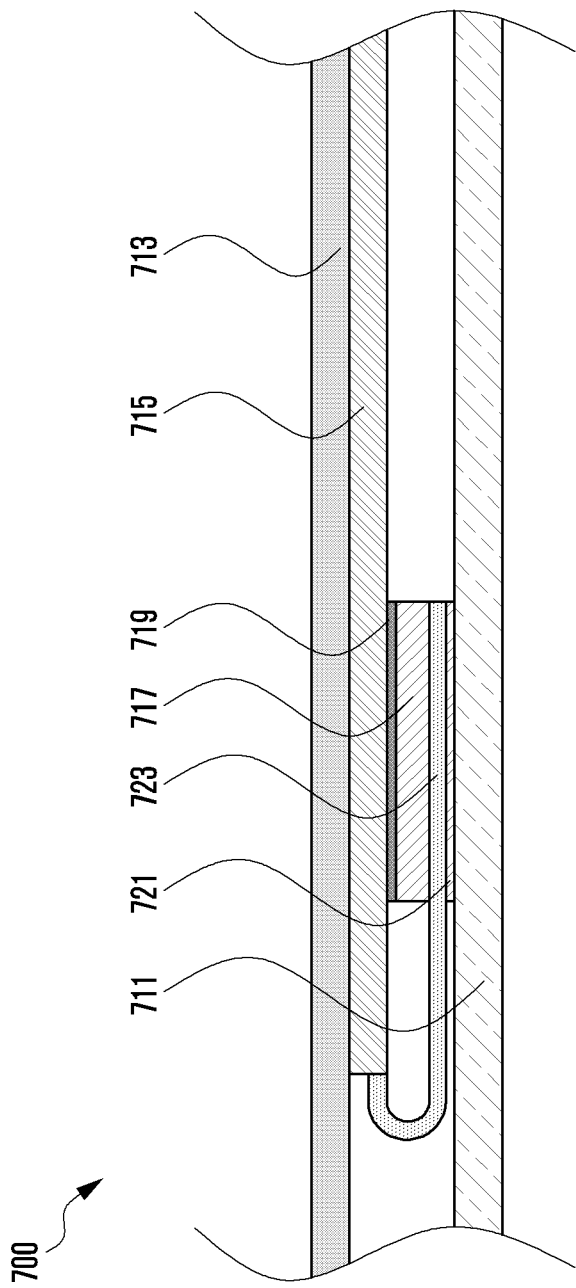
FIG. 7 is a cross-sectional view illustrating a part associated with a pressure sensor in an electronic device according to an embodiment of the present disclosure.
Figure 8:
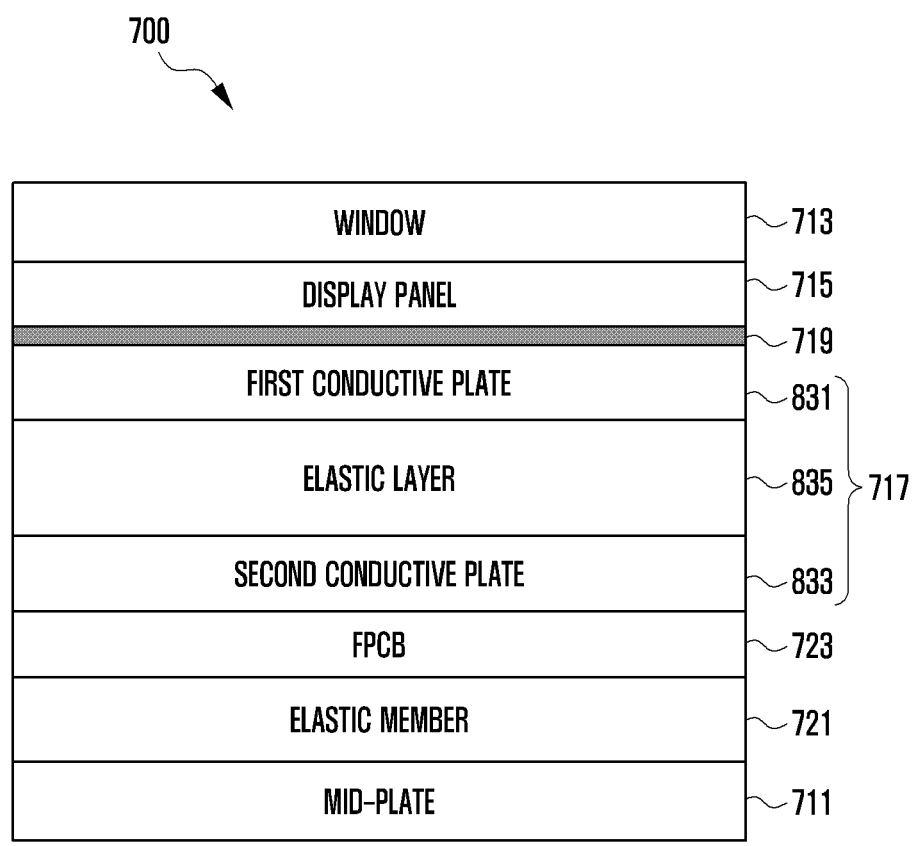
FIG. 8 is a cross-sectional view illustrating the electronic device shown of FIG. 7.

FIG. 7 is a cross-sectional view illustrating a part associated with a pressure sensor 717 in the electronic device 700 according to an embodiment of the present disclosure. FIG. 8 is a cross-sectional view illustrating the electronic device shown 700 in FIG. 7.

Referring to FIGS. 7 and 8, the electronic device 700 (e.g., electronic device 101 of FIG. 1, or electronic device 300 of FIG. 3) according to an embodiment of the present disclosure may include a display panel 715 interposed between a window 713 (e.g., window 613 of FIG. 6) of a front plate (e.g., front plate 410 of FIG. 4) and a back plate (e.g., back plate 430 of FIG. 4) and exposed through the window 713, a mid-plate 711 (e.g., mid-plate 420 of FIG. 4 or mid-plate 611 of FIG. 6) interposed between the display panel 715 and the back plate (e.g., back plate 430 of FIG. 4), and a pressure sensor 717 (e.g., pressure sensor 617 of FIG. 6) interposed between the display panel 715 and the mid-plate 711 and attached to the display panel 715 by an adhesive layer 719 (e.g., adhesive layer 619 of FIG. 6). In the electronic device 700 according to an embodiment, a flexible printed circuit board (FPCB) 723 may be interposed between the elastic member 721 and the second conductive plate 833.

According to an embodiment, the pressure sensor 717 includes a first conductive plate 831, a second conductive plate 833 interposed between the first conductive plate 831 and the mid-plate 711 and spaced from the first conductive plate 831, and an elastic member 721 interposed between the second conductive plate 833 and the mid-plate 711 and attached to the mid-plate 711.

According to an embodiment, the FPCB 723 may extend from a portion of the display panel 715 to support the pressure sensor 717.

According to an embodiment, the elastic member 721 may be interposed between the FPCB 723 and the mid-plate 711 and configured to supply a pressure specified to the FPCB 723. The pressure supplied from the elastic member 721 to the FPCB 723 is transmitted to the second conductive plate 833 of the pressure sensor 717 so that the pressure sensor 717 can sense the minimum pressure value regardless of the environmental factors, the change in elasticity of the elastic layer 835, and the change in the inter-electrode layer gap.

According to an embodiment, the display panel 715 is a touch screen display, and may include a touch sensor formed above the display. According to an embodiment, the display may include various displays such as OLED, LCD, QD, and the like. According to an embodiment, the display may have flexible characteristics. According to an embodiment, the touch sensor may be disposed, for example, between the window 713 and the display. Alternatively, the touch sensor may be disposed at least partially (at least one electrode layer) inside the display. According to an embodiment, the touch sensor may be implemented by a self-capacitance type or a mutual-capacitance type.

According to an embodiment, the window 713 may include a substantially rigid layer such as, for example, and without limitation, glass (including tempered glass or sapphire glass) or a substantially flexible layer such as polymer (e.g., polyimide (PI), polyethylene terephthalate (PET), polycarbonate (PC) or the like).

According to an embodiment, the pressure sensor 717 may include the first conductive plate 831 and the second conductive plate 833, and an elastic layer 835 disposed therebetween. According to another embodiment, unlike what is shown, the pressure sensor 717 may be disposed between the window 713 and the display panel 715. In this case, the first conductive plate 831 or the second conductive plate 833 may be disposed integrally with the touch sensor or disposed on a separate support member (e.g., PET). According to another embodiment, unlike what is shown, the pressure sensor 717 may be disposed at least partially (at least one electrode layer) inside the display. In this case, the first conductive plate 831 or the second conductive plate 833 may be disposed between the electrodes inside the display. According to an embodiment, the pressure sensor 717 may be implemented in a self-capacitance type. For example, the pressure sensor 717 may include the first conductive plate 831 including electrodes in a form of a plurality of repeated polygons (or circles), the second conductive plate 833 integrally extending over the entire area corresponding to the repeated plurality of polygons, the elastic layer 835 disposed between the first conductive plate 831 and the second conductive plate 833, and a pressure sensor (717) drive circuit (e.g., pressure sensor IC 333 of FIG. 3) electrically connected to the first and second conductive plates 831 and 833. According to an embodiment, the pressure sensor 717 may sense the pressure based on the change in capacitance between electrodes of each part of the first conductive plate 831 and the electrode of the second conductive plate 833. According to an embodiment, the positions or shapes of the first conductive plate 831 and the second conductive plate 833 may be changed from each other. According to an embodiment, the plurality of polygonal (or circular) electrodes of the first conductive plate 831 are arranged independently from each other, and the second conductive plate 833 has a single plate shape and may be arranged to correspond to electrodes in the form of a plurality of polygons (or circles) of the conductive plate 831.

According to an embodiment, the elastic layer 835 may be made of an elastic material.

According to various embodiments, the haptic actuator (not shown) may be disposed under the pressure sensor 717. According to an embodiment, the haptic actuator may provide various kinds of vibration feedback to all or part of the electronic device 700. According to another embodiment, the haptic actuator may be variously arranged at various positions of the electronic device 700 as well as under the pressure sensor 717, and may be plural.

Figure 9:
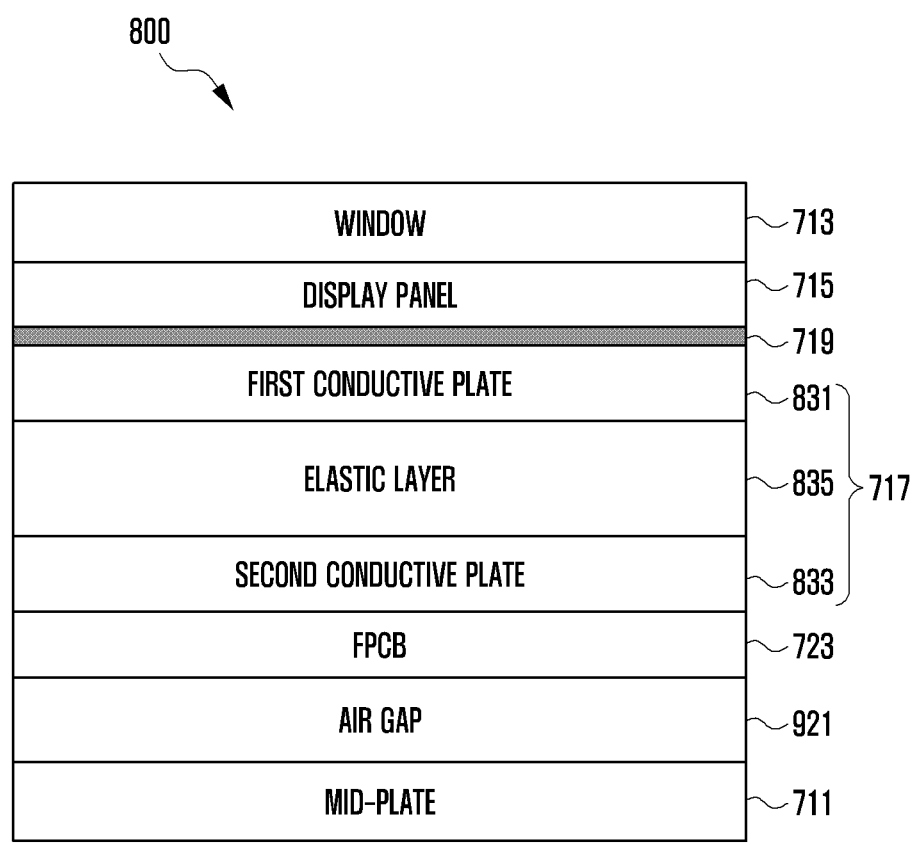
FIG. 9 is a cross-sectional view illustrating an electronic device according to various embodiments of the present disclosure.

FIG. 9 is a cross-sectional view illustrating an electronic device according to a comparative example. The electronic device according to the comparative example of FIG. 9 may be at least partially similar to or the same as the electronic device 700 of the present disclosure disclosed in FIGS. 7 and 8, and a description of the same configuration will not be repeated here.

Referring to FIG. 9, the electronic device 800 according to the comparative example may not include the elastic member 721 unlike the electronic device 700 according to an embodiment of the present disclosure. For example, unlike the electronic device 700 of the present disclosure shown in FIG. 8, the electronic device 800 according to the comparative example does not include the elastic member 721, and instead of the elastic member 721, may include an air gap 921. For example, in the electronic device 800 according to the comparative example, the air gap 921 may be disposed between the FPCB 723 and the mid-plate 711. Since the electronic device 800 according to the comparative example does not include the elastic member 721, the pressure value of the pressure sensor 717 may be irregular due to is not affected by the environmental factors, the change in elasticity of the elastic layer 835, and the change in the inter-electrode layer gap, so the performance of the pressure performance 717 may be degraded.

Hereinafter, when the environmental factors, the change in elasticity of the elastic layer 835, and the change in the inter-electrode layer gap that may occur in the electronic device and the factors occur, the electronic device 700 according to the present disclosure and the electronic device 800 according to the comparative example are comparatively described.

Figure 10:
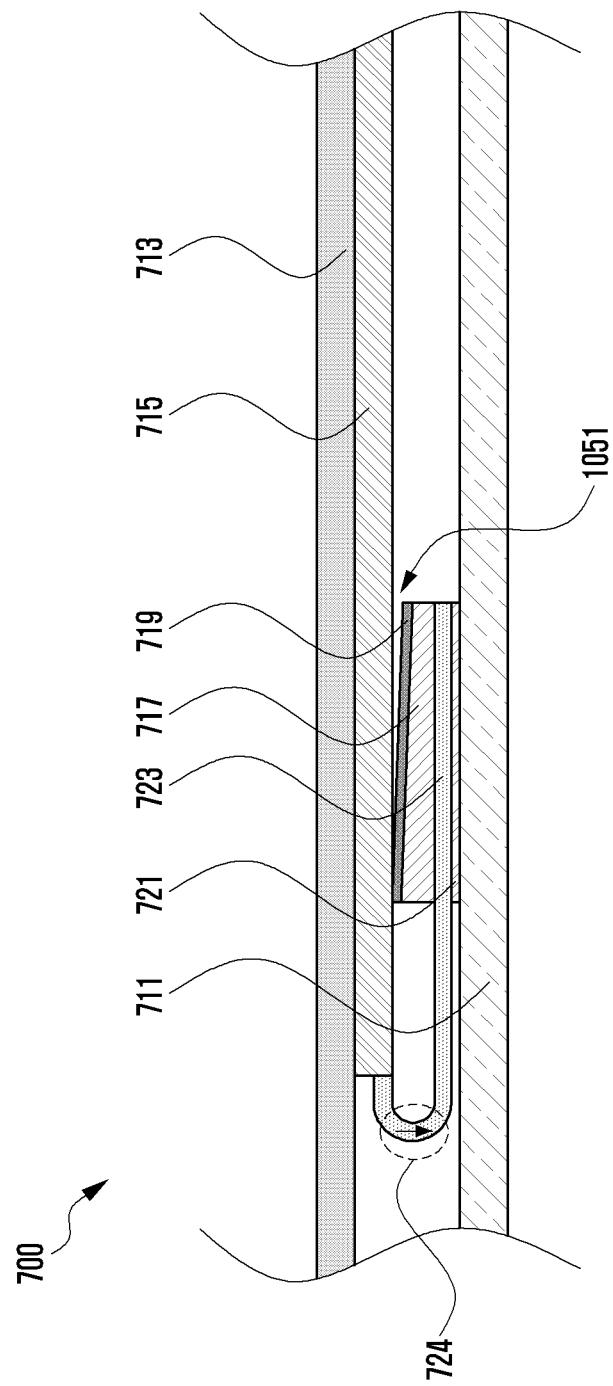
FIG. 10 is a cross-sectional view illustrating an occurrence of a gap between a display panel and a pressure sensor.

FIG. 10 is a diagram illustrating generation of a spacing 1051 between the display panel 715 and the pressure sensor 717.

Referring to FIG. 10, the pressure sensor 717 of the electronic device 700 is supported by the FPCB 723 and attached to the back surface of the display panel 715, but the adhesive strength of the adhesive layer 719 may be degraded due to factors such as the surrounding environment, the change in temperature, the change in humidity, the external impact, or the lifetime depression. If the adhesive strength of the adhesive layer 719 is lowered, a spacing 1051 may be generated between the pressure sensor 717 and the display panel 715 by the restoring force of the FPCB 723 bent 724 and extending from a portion of the display panel 715 and supporting the pressure sensor 717.

Figure 11A:
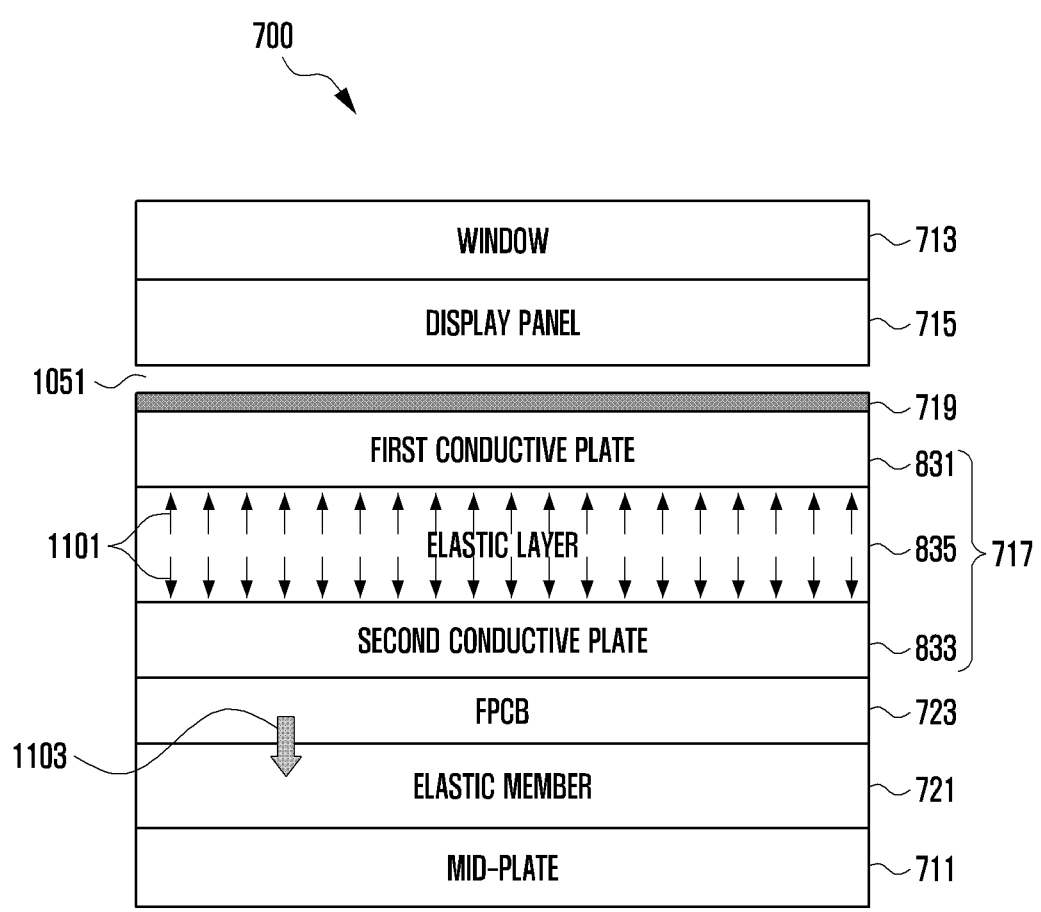
FIGS. 11A and 11B are diagrams illustrating the electronic device according to the embodiment of the present disclosure and the electronic device according to an example when the gap occurs between the display panel and the pressure sensor in a state in which there is no pressure touch.
Figure 11B:
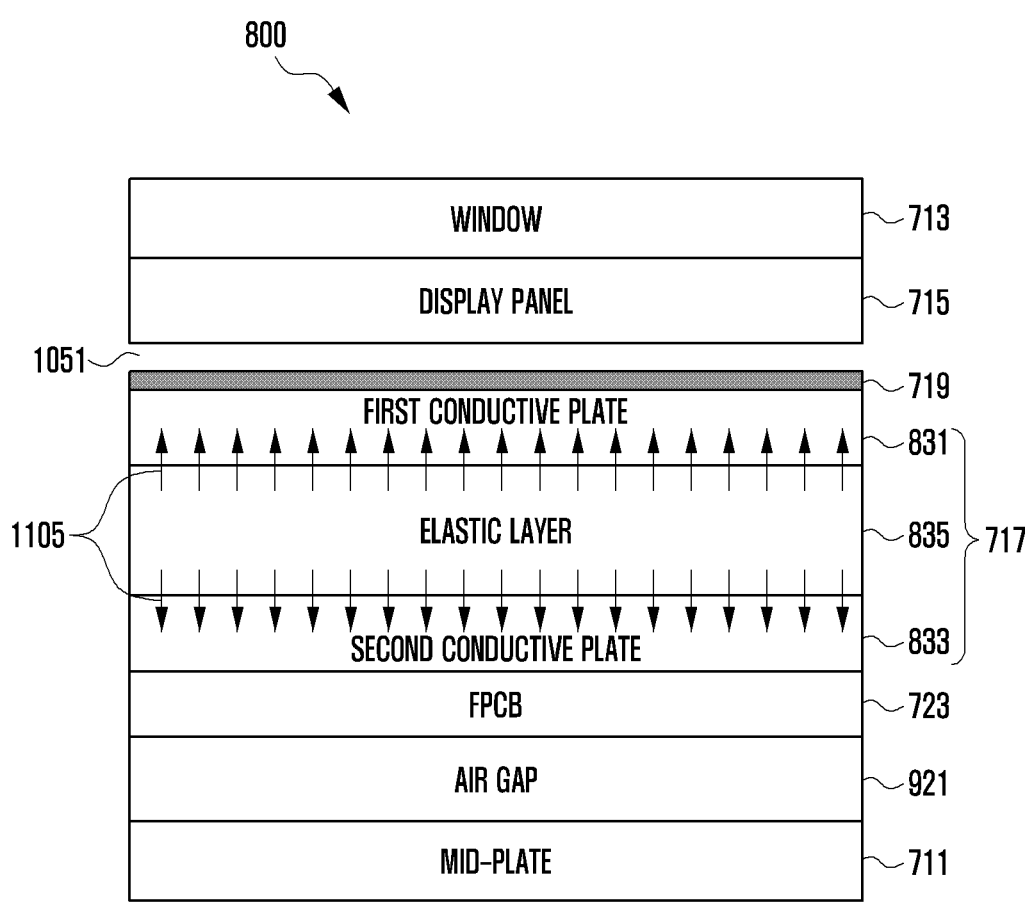

FIGS. 11A and 11B are comparison diagrams between the electronic device 700 of the present disclosure and the electronic device according to the comparative example when the spacing 1051 is generated between the display panel 715 and the pressure sensor 717 in the state in which there is no pressure touch According to an embodiment, FIG. 11A is a diagram illustrating an electronic device 700 according to an embodiment of the present disclosure when the spacing 1051 is generated between the display panel 715 and the pressure sensor 717, and FIG. 11*b* is a diagram illustrating the electronic device 800 according to the comparative example when the spacing 1051 is generated between the display panel 715 and the pressure sensor 717.

Referring to FIG. 11A, in the electronic device 700 according to the embodiment of the present disclosure, when the adhesive strength of the adhesive layer 719 is lowered, the pressure sensor 717 is subjected to a force in the back direction of the electronic device 700, so the pressure sensor 717 may have the spacing 1051 from the display panel 715. According to an embodiment, the pressure sensor 717 may cause the change in elasticity of the elastic layer 835 before and after the spacing 1051 is generated. For example, when the spacing 1051 is generated, a force pressing the first conductive plate 831 from above by the pressure sensor 717 disappears, and a force pressing the second conductive plate 833 from below by the elastic member 721 may also be weakened. According to an embodiment, because when the spacing 1051 is generated, the thickness of the elastic layer 835 is increased as indicated by the arrow 1101 and the pressure value 1103 sensed by the pressure sensor 717 even if there is no external pressure, the pressure sensor 717 according to the present disclosure may sense in advance the situation in which the spacing 1051 is generated due to the reduction in the adhesive strength of the adhesive layer 719.

Referring to FIG. 11B, in the pressure sensor 717 according to the comparative example, the change in elasticity of the elastic layer 835 may be relatively small before and after the spacing 1051 is generated. This is because in the electronic device 800 according to the comparative example, instead of the elastic member 721, an air gap 921 is disposed under the pressure sensor 717. For example, when the spacing 1051 is generated, the pressure sensor 717 shifts to the air gap 921 as far as the spacing 1051 is generated, so the change in the thickness of the elastic layer 835 of the pressure sensor 717 is relatively small as indicated by the arrow 1105. As a result, as indicated by the arrow 1105, it is difficult to sense the generation of the spacing due to the reduction in the adhesive strength of the adhesive layer 719. For example, the electronic device 800 according to the comparative example may deliver a force of F2 less than F1 to the pressure sensor 717 when the user applies the force of F1 to the display panel 715 at the time of the generation of the spacing 1051. When the force F2 delivered to the pressure sensor 717 is less than the threshold value associated with the performance of the function of the electronic device 800, the electronic device 800 may not perform the function in response to the pressure delivered by the user.

Figure 12:
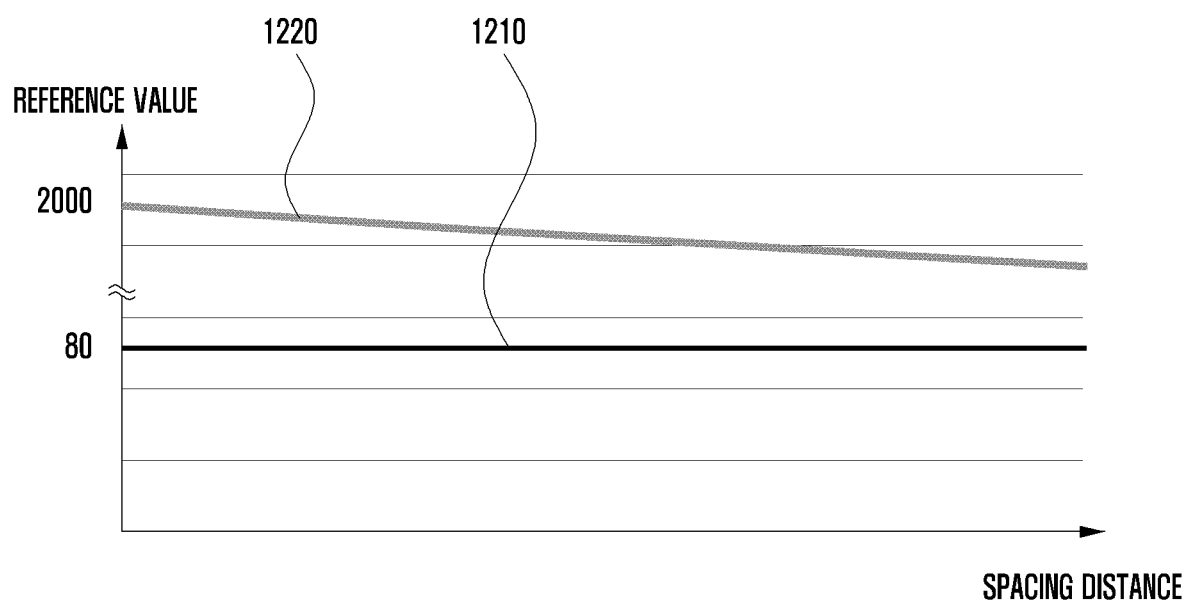
FIG. 12 is a graph illustrating an experimental measurement of a pressure value of the pressure sensor in response to the occurrence of the gap between the display panel and the pressure sensor in the state in which there is no pressure touch.

FIG. 12 is a graph illustrating an experimentally measured pressure value of the pressure sensor 717 according to the generation of the gap 1051 between the display panel 715 and the pressure sensor 717 in the state in which there is no pressure. 12. According to an embodiment, reference numeral 1210 may denote a pressure value sensed by the pressure sensor 717 according to the comparative example, and reference numeral 1220 may denote a pressure value sensed by the pressure sensor 717 according to an embodiment of the present disclosure.

Referring to FIG. 12, the pressure sensor 717 according to the comparative example can be appreciated that when the spacing 1051 distance is generated between the display panel 715 and the pressure sensor 717, a reference value which is the pressure value sensed in the state in which there is no pressure touch is constant as 80. On the other hand, the pressure sensor 717 according to an embodiment of the present disclosure can be appreciated that as the spacing 1051 between the display panel 715 and the pressure sensor 717 is increased, a reference value which is the pressure value sensed in the state in which there is no pressure touch is reduced from 2000. In FIG. 12, the pressure values 80, 2000, etc. sensed by the pressure sensor 717 are relative values and are illustrative only and the present disclosure is not limited to these values.

The electronic device 700 according to an embodiment of the present disclosure may include an elastic member for supplying a specified pressure to the second conductive plate 833 even when the spacing 1051 between the display panel 715 and the pressure sensor 717 is generated, so the pressure value may vary according to the spacing 1051 distance between the display panel 715 and the pressure sensor 717 in the state in which there is no pressure touch. Therefore, the electronic device 700 of the present disclosure can accurately sense the pressure value regardless of the environmental factors, the change in elasticity of the elastic layer 835 and the change in the inter-electrode layer gap.

According to an embodiment, the electronic device 700 may adjust (set), as the reference value, the pressure value varying according to the spacing 1051 distance between the display panel 715 and the pressure sensor 717 in the state in which there is no pressure touch.

Figure 13A:
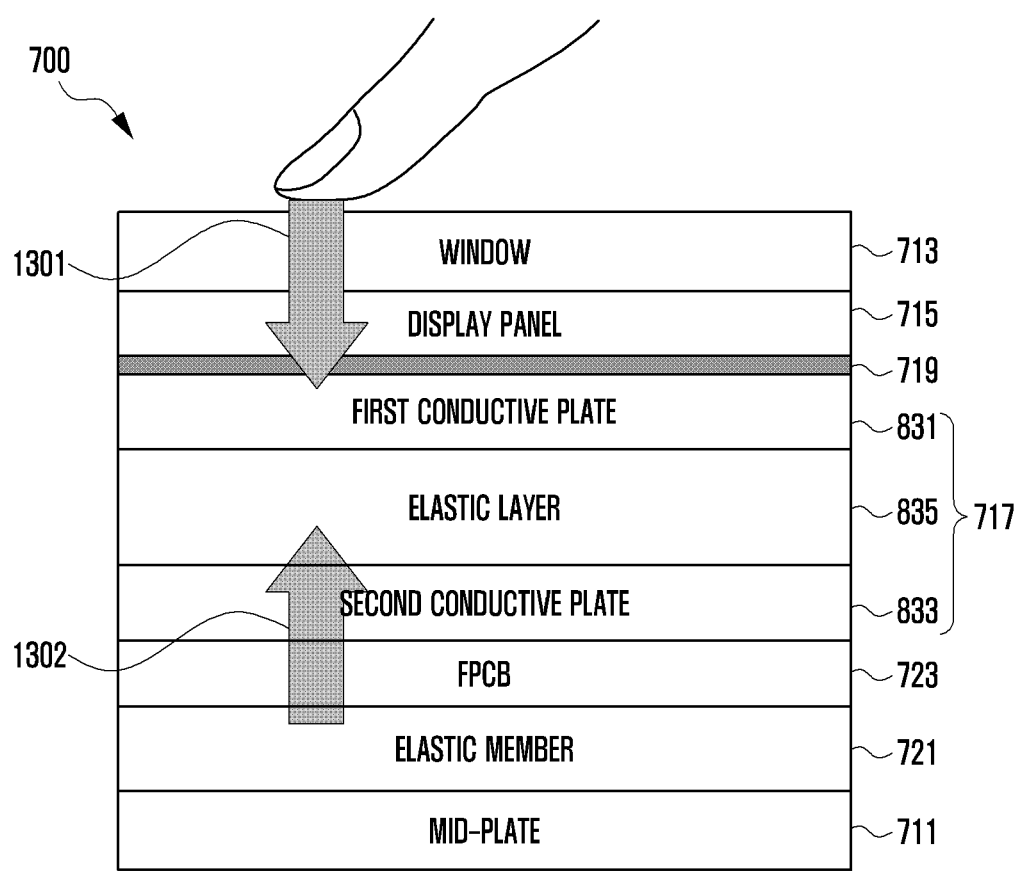
FIGS. 13A and 13B are diagrams illustrating the electronic device according to an embodiment of the present disclosure and the electronic device according to an example when the gap does not occur between the display panel and the pressure sensor in the state in which there is no pressure touch.
Figure 13B:
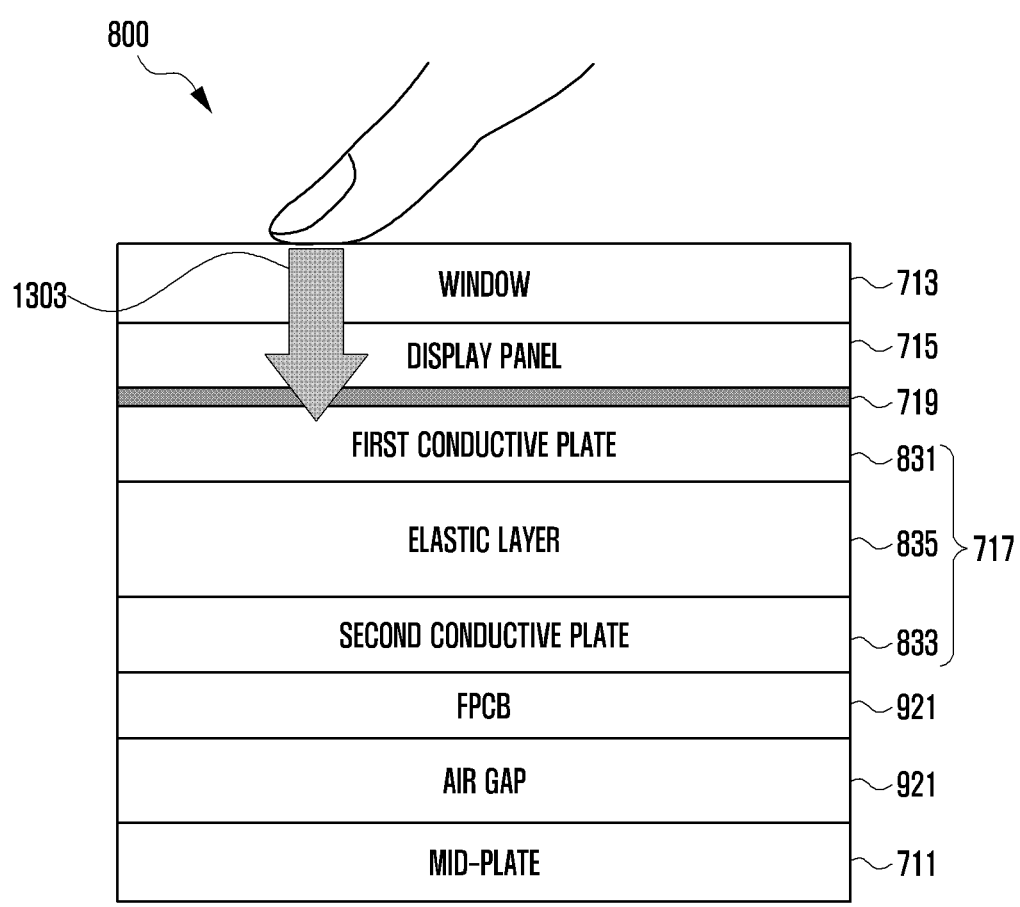

FIGS. 13A and 13B are comparison diagrams between the electronic device 700 of the present disclosure and the electronic device according to the comparative example when the spacing 1051 is not generated between the display panel 715 and the pressure sensor 717 in the state in which there is the pressure touch The following Table 1 shows a comparison between the electronic device 700 of the present disclosure and the electronic device according to the comparative example when the spacing 1051 is not generated between the display panel 715 and the pressure sensor 717 in the state in which there is the pressure touch.

TABLE 1

|  | The present disclosure | Comparative Example |
|---|---|---|
| Reference value of pressure sensor 717 | 2000 | 80 |
| Pressure value of pressure sensor 717 (Generation (x) of spacing 1051) | 2080 (2000 + 80) | 160 (80 + 80) |

FIG. 13A is a diagram illustrating the electronic device 700 of the present disclosure when the spacing 1051 is not generated between the display panel 715 and the pressure sensor 717 in the state in which there is the pressure touch.

Referring to FIG. 13A and the above Table 1, the pressure sensor 717 according to an embodiment of the present disclosure can be appreciated that the reference value which is a pressure value sensed by the pressure sensor 717 in the state in which there is no pressure touch may be 2000. When the pressure touch is received, the pressure sensor 717 according to an embodiment may receive a first force 1301 delivered to the upper part of the pressure sensor 717 by the pressure touch of the user and a second force 1302 delivered to the lower part of the pressure sensor 717 by the elastic force of the elastic member 721. If the force delivered to the pressure sensor 717 by the first force 1301 and the second force 1302 is 80, the pressure value of the pressure sensor 717 becomes 2080.

FIG. 13B is a diagram illustrating the electronic device 800 of the comparative example when the spacing 1051 is not generated between the display panel 715 and the pressure sensor 717 in the state in which there is the pressure touch. Referring to FIG. 13B and the above Table 1, the pressure sensor 717 according to the comparative example can be appreciated that the reference value sensed by the pressure sensor 717 in the state in which there is no pressure touch may be 80. The pressure sensor 717 according to the comparative example may receive a third force 1303 delivered to the upper part of the pressure sensor 717 by the pressure touch of the user. When the force transmitted to the pressure sensor 717 by the third force 1303 is 80, the pressure value of the pressure sensor 717 becomes 160.

If the threshold value for determining whether or not the pressure touch is made to perform the function of the electronic device is "a reference value +70", the threshold value of the pressure sensor 717 according to the present disclosure becomes 2070, and the threshold value of the pressure sensor 717 according to the comparative example may be 150. In this case, the pressure values of each of the pressure sensors 717 of the present disclosure and the comparative example shown in the above Table 1 exceeds the threshold value, so that the pressure touch can be normally sensed.

Figure 14A:
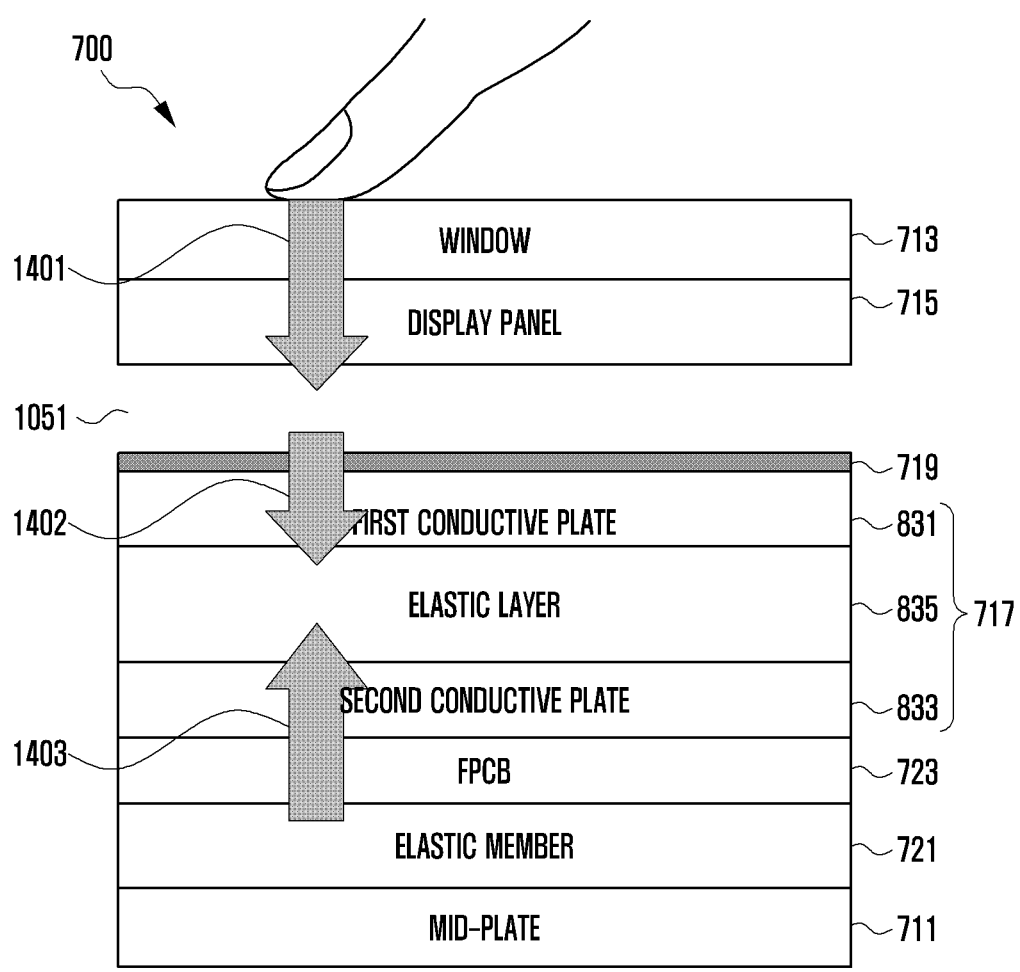
FIGS. 14A and 14B are diagrams illustrating the electronic device according to an embodiment of the present disclosure and the electronic device according to an example when the gap occurs between the display panel and the pressure sensor in a state in which there is the pressure touch.
Figure 14B:
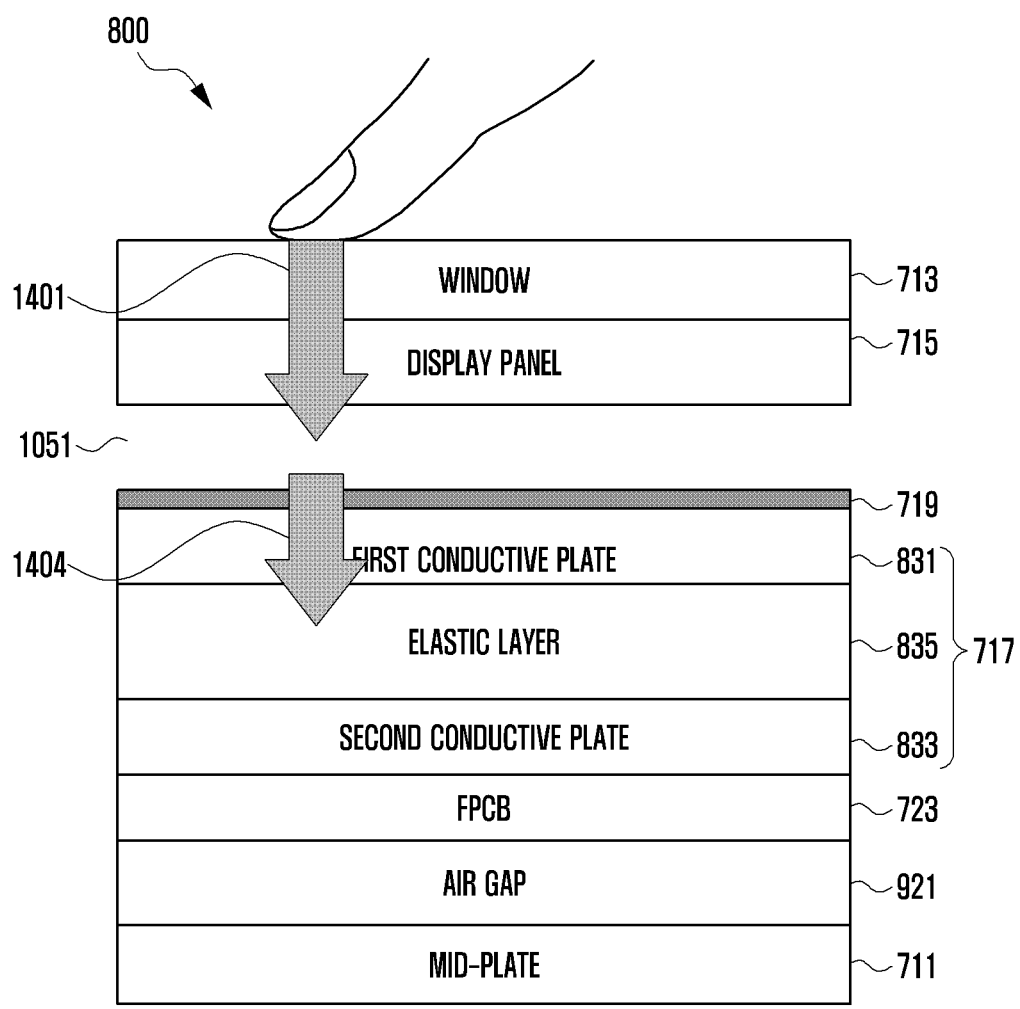

FIGS. 14A and 14B are comparison diagrams between the electronic device 800 of the present disclosure and the electronic device according to the comparative example when the spacing 1051 is generated between the display panel 715 and the pressure sensor 717 in the state in which there is the pressure touch. The following Table 2 shows a comparison between the electronic device 800 of the present disclosure and the electronic device according to the comparative example when the spacing 1051 is generated between the display panel 715 and the pressure sensor 717 in the state in which there is the pressure touch.

TABLE 2

|  | The present disclosure | Comparative Example |
|---|---|---|
| Reference value of pressure sensor 717 | 1980 | 80 |
| Pressure value of pressure sensor 717 (Generation (0) of spacing 1051) | 2058 (1980 + 78) | 145 (80 + 65) |

FIG. 14A is a diagram illustrating the electronic device 700 of the present disclosure when the spacing 1051 is generated between the display panel 715 and the pressure sensor 717 in the state in which there is the pressure touch. Referring to FIG. 14A and the above Table 2, the pressure sensor 717 according to an embodiment of the present disclosure can be appreciated that the reference value which is a pressure value sensed by the pressure sensor 717 in the state in which there is the pressure touch may be 1980. When the pressure touch 1401 is received, the pressure sensor 717 according to an embodiment may receive a first force 1402 delivered to the upper part of the pressure sensor 717 by a pressure touch 1401 of a user and a second force 1403 delivered to the lower part of the pressure sensor 717 by the elastic force of the elastic member 721. If the force delivered to the pressure sensor 717 by the first force 1402 and the second force 1403 is 78, the pressure value of the pressure sensor 717 becomes 2058.

FIG. 14B is a diagram illustrating the electronic device 800 of the comparative example when the spacing 1051 is generated between the display panel 715 and the pressure sensor 717 in the state in which there is the pressure touch. Referring to FIG. 14B and the above Table 2, the pressure sensor 717 according to the comparative example can be appreciated that the reference value may be 80 even if the spacing 1051 is generated between the display panel 715 and the pressure sensor 717. The pressure sensor 717 according to the comparative example may receive a third force 1404 delivered to the upper part of the pressure sensor 717 by the pressure touch 1401 of the user. The pressure sensor 717 according to the comparative example receives 65 less than 80 which is the force delivered to the pressure sensor 717 by the third force 1404 before the spacing 1051 is generated. In this case, the pressure value of the pressure sensor 717 becomes 145.

If the threshold value for determining whether or not the pressure touch is made to perform the function of the electronic device is "a reference value +70", the threshold value of the pressure sensor 717 according to the present disclosure becomes 2050, and the threshold value of the pressure sensor 717 according to the comparative example may be 150. In this case, the pressure value of the pressure sensors 717 of the present disclosure and the comparative example shown in the above Table 1 exceeds the threshold value, so that the pressure touch can be normally sensed. However, the pressure value of the pressure sensors 717 of the comparative example shown in the above Table 1 is less than the threshold value, so that the pressure touch can be normally sensed.

Figure 15:
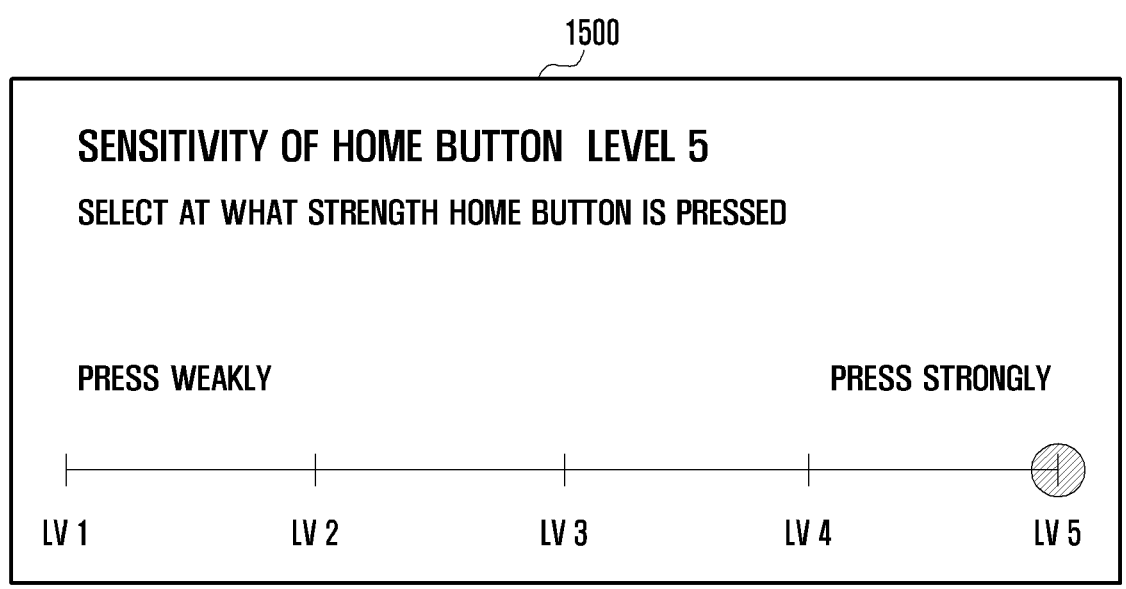
FIG. 15 is a diagram illustrating an example of a user interface for allowing the electronic device to set a plurality of pressure levels according to an embodiment of the present disclosure.

FIG. 15 is a diagram illustrating an example of a user interface for allowing the electronic device to set a plurality of pressure levels.

The electronic device 700 according to an embodiment may divide the pressure value of the pressure sensor 717 into a plurality of levels (e.g., LV1-LV5) and perform different functions based on a plurality of divided levels. To this end, as shown in FIG. 15, the electronic device 700 may provide a user interface to allow the user to adjust the strength of the pressure. According to an embodiment, the number of levels for dividing the pressure values is not limited.

Figure 16:
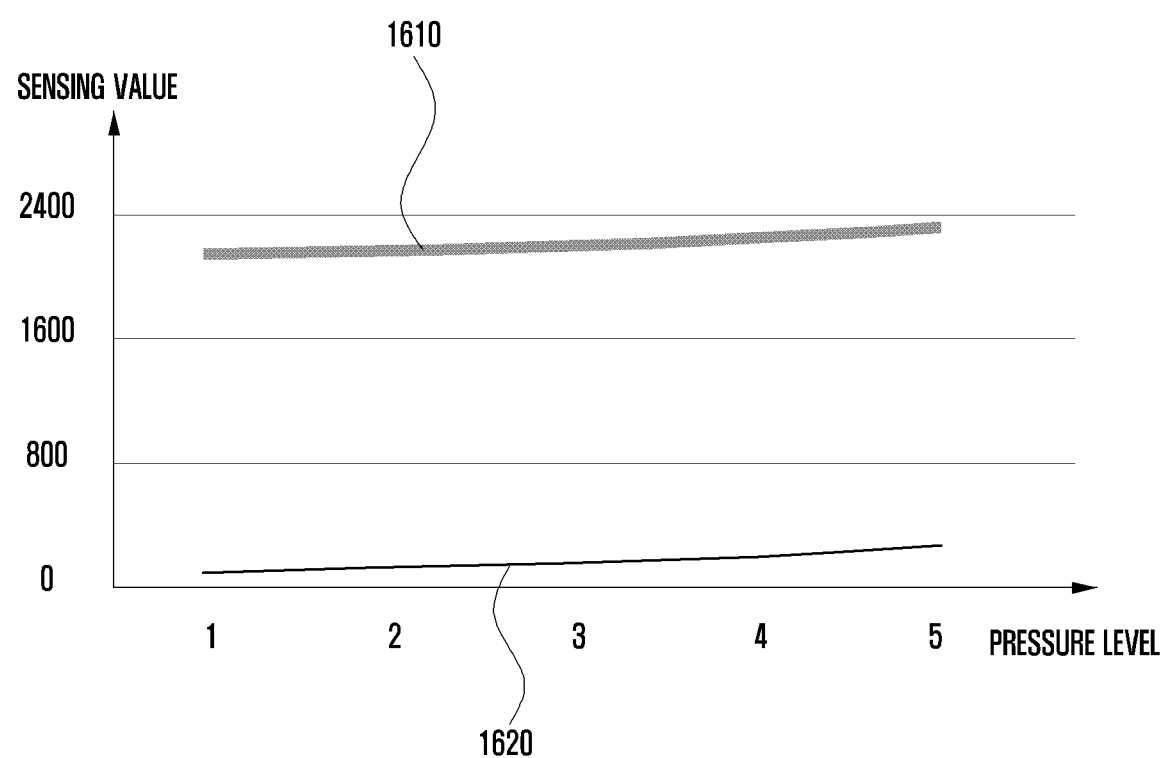
FIG. 16 is a graph illustrating an example of the plurality of pressure levels set by the electronic device according to the present disclosure.
Figure 17:
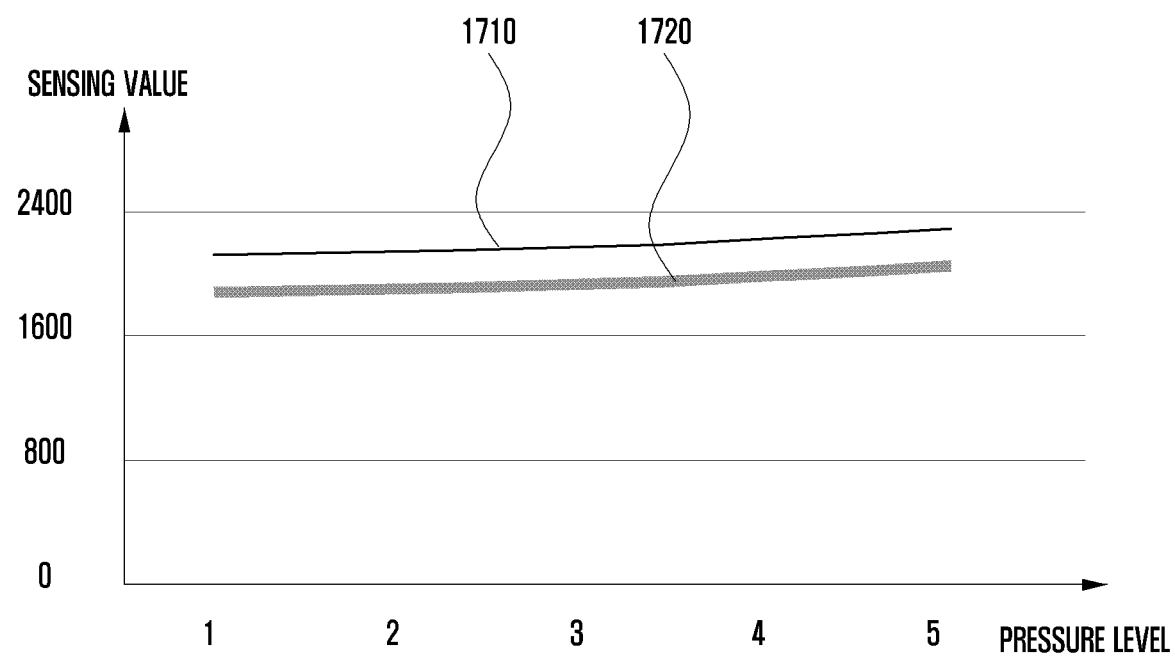
FIG. 17 is a graph illustrating an example of reference values adjusted by the electronic device according to the present disclosure.

FIG. 16 is a graph illustrating an example of the plurality of pressure levels set by the electronic device according to the present disclosure. FIG. 17 is a diagram illustrating an example of reference values adjusted by the electronic device according to the present disclosure. The graph indicated by '1610' in FIG. 16 may show the pressure value of the pressure sensor 717 of the electronic device 700 according to the present disclosure, and the graph indicated by '1620' in FIG. 16 may show the pressure value of the pressure sensor 717 of the pressure sensor 800 according to the comparative example. Table 3 may be an example of threshold values for dividing the sensing values of each of the graph 1610 and the graph 1620 shown in FIG. 16 into the plurality of pressure levels.

Referring to FIG. 16 and the following Table 3, the thresholds of the electronic device 700 according to the present disclosure are set higher than the thresholds of the electronic device 800 according to the comparative example. This is because the electronic device 700 according to the present disclosure increases the sensing value of the pressure sensor 717 because the force delivered to the lower part of the pressure sensor 717 is added by the elastic force of the elastic member 721.

TABLE 3

|  | Level 1 | Level 2 | Level 3 | Level 4 | Level 5 |
| --- | --- | --- | --- | --- | --- |
| Threshold value (Comparative Example) | 90 | 122 | 150 | 195 | 260 |
| The present disclosure | 2090 | 2122 | 2150 | 2195 | 2260 |

According to an embodiment, the electronic device 700 according to the present disclosure adjusts the pressure value varying according to the spacing 1051 distance between the display panel 715 and the pressure sensor 717 to the reference value in the state in which there is no pressure touch, and therefore as shown in FIG. 17, the plurality of threshold values may be adjusted from a first setting value 1710 to a second setting value 1720 in response to the adjustment of the reference value. According to an embodiment, the electronic device 700 according to the present disclosure may adjust a plurality of thresholds to a low value in response to the increase in the spacing 1051 distance between the display panel 715 and the pressure sensor 717. For example, in response to the increase in the spacing 1051 distance between the display panel 715 and the pressure sensor 717, the electronic device 700 may determine that the plurality of thresholds are also at the first setting value 1710 to the second setting value 1720 and the second setting value 1720 may be a value less than or equal to the first setting value 1710.

Figure 18:
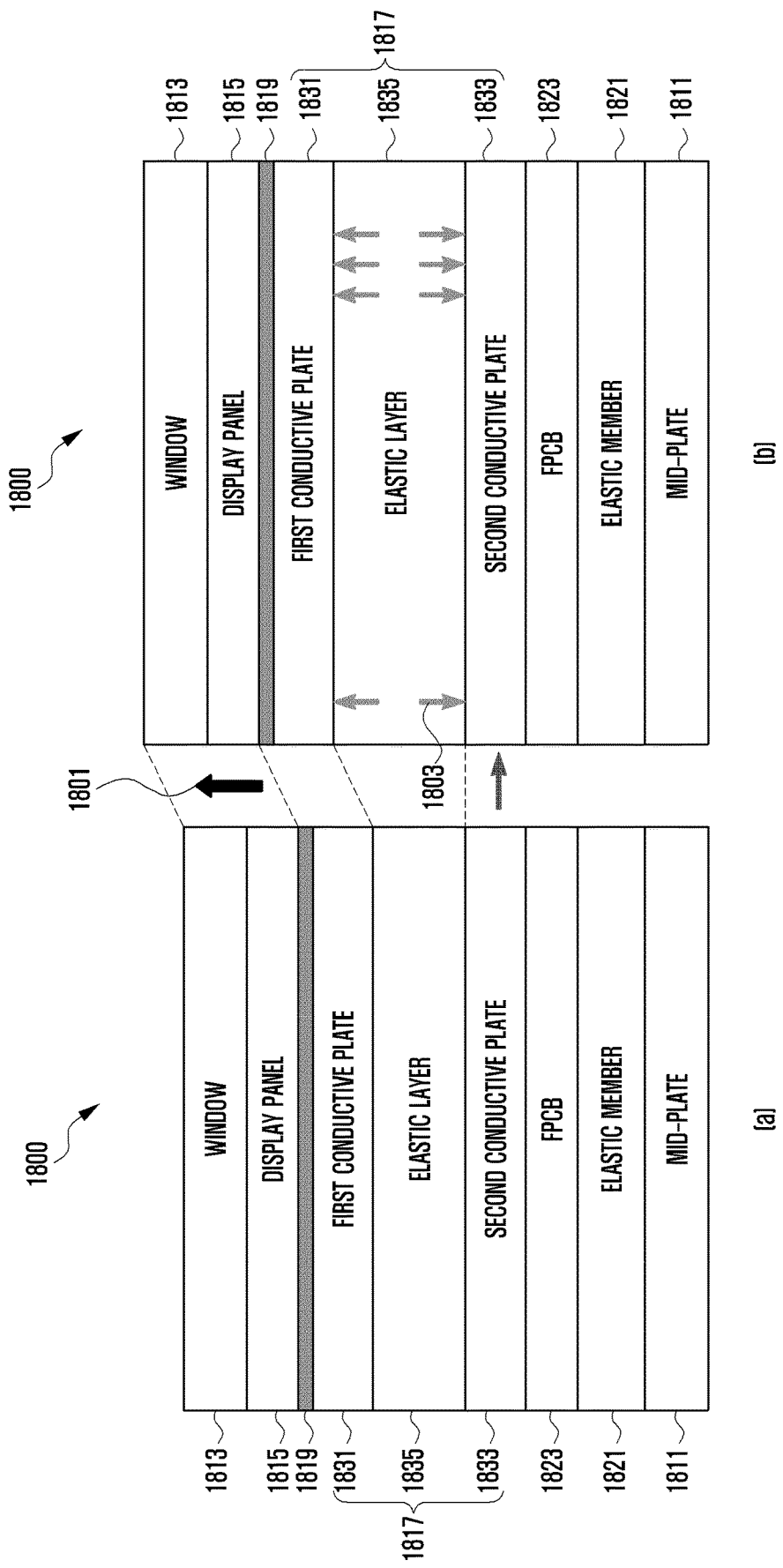
FIG. 18 is a diagram illustrating a phenomenon in which a window and a display panel are lifted up by an external impact.

FIG. 18 is a diagram illustrating a phenomenon in which a window and a display panel are lifted up by an external impact.

According to various embodiments, factors other than an adhesive strength of an adhesive layer 1819 cause a spacing between a display panel 1815 and a pressure sensor 1817. For example, as illustrated in FIG. 18, an electronic device 1800 (e.g., electronic device 101 of FIG. 1, or electronic device 300 of FIG. 3) according to another embodiment of the present disclosure includes a display panel 1815 interposed between a window 1813 which is a front plate and the back plate and exposed through the window 1813, a mid-plate 1811 interposed between the display panel 1815 and the back plate, and a pressure sensor 1817 interposed between the display panel 1815 and the mid-plate 1811 and attached to the display panel 1815 by an adhesive layer 1819. In the electronic device 1800 according to another embodiment, a flexible printed circuit board (FPCB) 1823 may be interposed between an elastic member 1821 and a second conductive plate 1833.

According to another embodiment, the electronic device 1800 may have the same or similar components as or to the electronic device 700 illustrated in FIG. 7. The electronic device 1800 according to another embodiment may cause the window 1813 and the display panel 1815 to be lifted up due to the external impact even if the adhesive strength of the adhesive layer 1819 is not lowered. When the window 1813 and the display panel 1815 are lifted up by the external impact, as illustrated in FIG. 11A, the change in elasticity of the elastic layer 1835 occurs and the pressure value of the pressure sensor 1817 can vary.

Reference numeral 1831, which is not described in connection with FIG. 18, may be the "first conductive plate" of the pressure sensor 1817.

Figure 19:
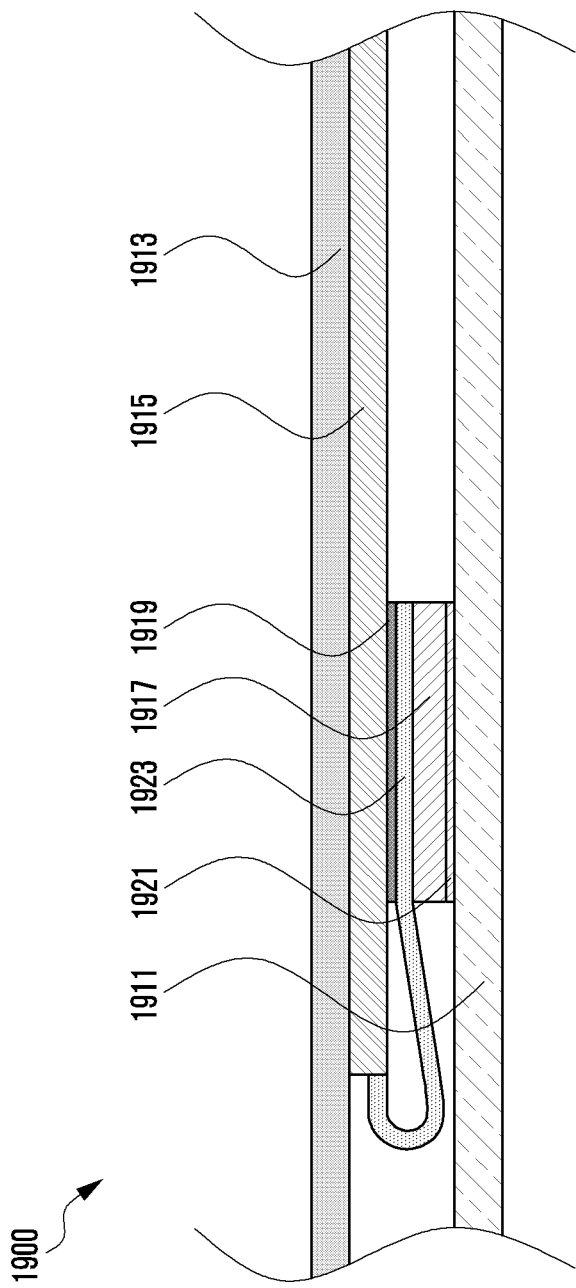
FIG. 19 is a cross-sectional view illustrating a part associated with a pressure sensor in an electronic device according to another embodiment of the present disclosure.
Figure 20:
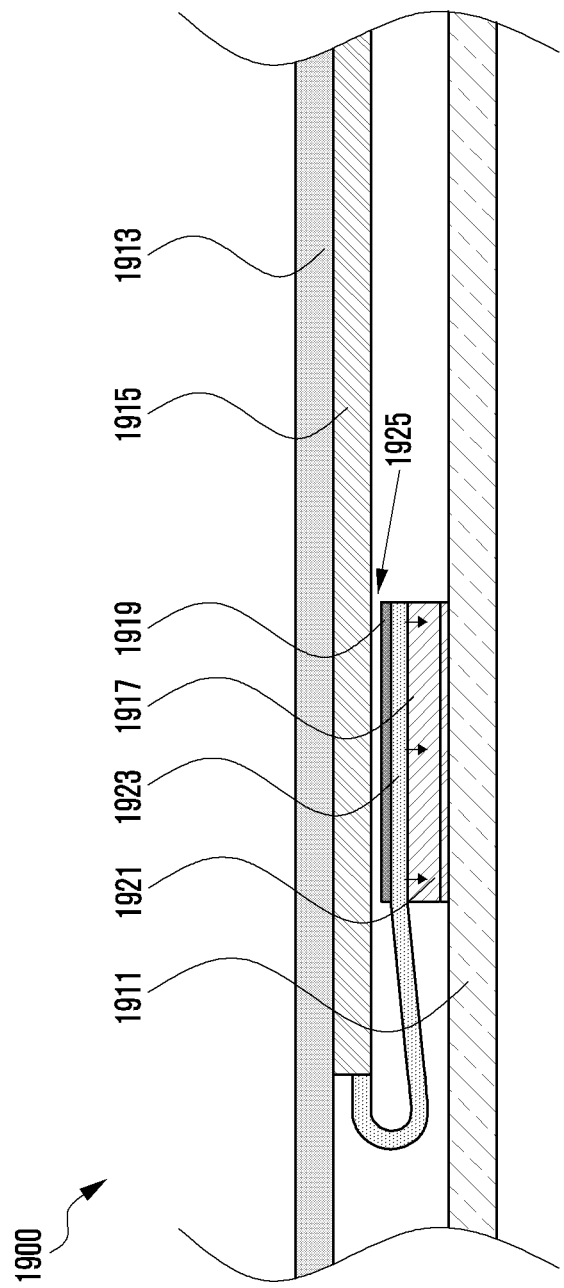
FIG. 20 is a diagram illustrating an occurrence of a gap between a display panel and a pressure sensor in an electronic device according to another embodiment of the present disclosure.

FIG. 19 is a cross-sectional view illustrating a part associated with a pressure sensor in an electronic device according to another embodiment of the present disclosure. FIG. 20 is a diagram illustrating an occurrence of a gap between a display panel and a pressure sensor in an electronic device according to another embodiment of the present disclosure.

Referring to FIG. 19, an electronic device 1900 (e.g., electronic device 101 of FIG. 1, or electronic device 300 of FIG. 3) according to another embodiment of the present disclosure includes a display panel 1915 interposed between a window 1913 which is a front plate and the back plate and exposed through the window 1913, a mid-plate 1911 interposed between the display panel 1915 and the back plate, and a pressure sensor 1917 interposed between the display panel 1911 and the mid-plate 1911 and attached to the display panel 1915 by an adhesive layer 1919. The electronic device 1900 according to another embodiment has an elastic member 1921 interposed between the pressure sensor 1917 and the mid-plate 1911 and a flexible printed circuit board (FPCB) 1923 interposed between the adhesive layer 1919 and the pressure sensor 1917.

Referring to FIG. 20, the pressure sensor 1917 of the electronic device 1900 is supported by the FPCB 1923 and attached to the back surface of the display panel 1915, but the adhesion of the adhesive layer 1919 may be degraded due to factors such as the surrounding environment, the change in temperature, the change in humidity, the external impact, the lifetime depression, or the like. If the adhesive strength of the adhesive layer 1919 is lowered, a spacing 1925 may be generated between the FPCB 1923 and the display panel 1917 by the restoring force of the FPCB 1923 bent and extending from a portion of the display panel 1923 and supporting the pressure sensor 1917. In the electronic device 1900 according to another embodiment, when a spacing 1925 is generated between the pressure sensor 1917 and the display panel 1915, the force due to the load of the FPCB 1923 is delivered to the upper part of the pressure sensor 1917, so the pressure value of the pressure sensor 1917 may be increased.

According to another embodiment, the electronic devices 1800 and 1900 according to another embodiment of FIGS. 19 and 20 may have the same or similar components as or to the electronic device 700 illustrated in FIG. 7.

There is provided a method for sensing, by an electronic device (e.g., electronic device 700 of FIG. 7), to sense a pressure according to various embodiments of the present disclosure, the electronic device 700 including the display panel (e.g., display panel 715 of FIG. 7) interposed between the front plate (e.g., front plate 410 of FIG. 4) and the back plate (e.g., back plate 430 of FIG. 4) and exposed through the front plate 410, the mid-plate (e.g., mid-plate 711 in FIG. 7) interposed between the display panel 715 and the back plate 430, a pressure sensor (e.g., pressure sensor 717 of FIG. 8) including the first conductive plate (e.g., first conductive plate 831 in FIG. 8) interposed between the display panel 715 and the mid-plate 711 and a second conductive plate 833 interposed between the first conductive plate 831 and the mid-plate 711 and (e.g., second conductive plate 833 of FIG. 8) spaced from the first conductive plate 831, and an elastic member (e.g., elastic member 721 of FIG. 8) interposed between the second conductive plate 833 and the mid-plate 711 and attached to the mid-plate 711, the method may including: determining the pressure level using the pressure sensor 717 while there is no external pressure against the front plate 410; and adjusting at least one threshold value for the electronic device 700 to use based at least in part on the determined pressure level when there is the external pressure against the front plate 410. The method may include an operation of displaying at least one graphic user interface (GUI) and selecting the GUI and/or activating the function associated with the GUI if the external pressure exceeds the at least one threshold value. The method may further include confirming whether the specified condition is satisfied and determining the pressure level if the specified condition is met. The specified condition may include a specified period of time during which the user input is not received, a specified time, a specified period, and/or a connection to a charger.

Figure 21:
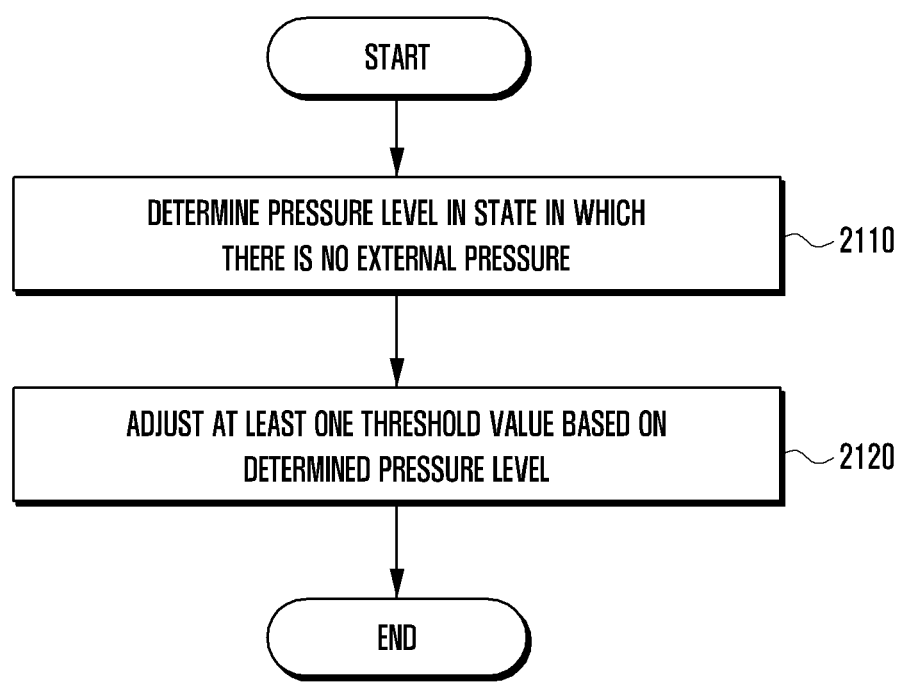
FIG. 21 is a flowchart illustrating an operation of the electronic device according to an embodiment of the present disclosure.

FIG. 21 is a flowchart illustrating an operation of the electronic device according to an embodiment of the present disclosure. Hereinafter, the operation of the electronic device according to the embodiment of the present disclosure will be described with reference to FIG. 21.

In operation 2110, the processor 310 of the electronic device 700 according to an embodiment may determine the pressure level using the pressure sensor 717 while there is no external pressure against the front plate. For example, the processor 310 may confirm whether the electronic device 700 satisfies a specified condition and may determine the pressure level if the specified condition is satisfied.

According to an embodiment, the specified condition may include a specified period of time during which the user input is not received, a specified time, a specified period, and/or a connection to a charger. For example, if the user input is not received during a period of time, the processor 310 may drive the pressure sensor 717 to obtain the pressure value in the state in which there is no pressure touch and set the obtained pressure value as the reference value. If the pressure sensor 717 is driven during the specified time, for example, a night time (e.g., from midnight to dawn), the processor 310 may drive the pressure sensor 717 to obtain the pressure value in the state in which there is no pressure touch and set the obtained pressure value as the reference value. The processor 310 drives the pressure sensor 717 at the specified period, for example, a period of 6 hours to obtain the pressure value in the state in which there is no pressure touch and set the obtained pressure value as the reference value. If it is sensed that the electronic device 700 is connected to the charger, the processor 310 may drive the pressure sensor 717 to obtain the pressure value in the state in which there is no pressure touch and set the obtained pressure value as the reference value. The processor 310 may drive the pressure sensor 717 in response to the user input to obtain the pressure value in the state in which there is no pressure touch and set the obtained pressure value as the reference value.

At operation 2120, the processor 310 of the electronic device 700 according to an embodiment may adjust, based on the determined pressure level, at least one threshold for the electronic device 700 to use while there is the external pressure against the front plate. For example, the processor 310 may adjust the plurality of thresholds for determining the strength of the pressure to the plurality of pressure levels based on the determined reference value. According to an embodiment, the threshold may be at least one.

According to an embodiment, the processor 310 may determine the pressure level corresponding to the sensed external pressure based on the plurality of adjusted thresholds if the external pressure against the front plate is sensed, and execute the specified function based on the determined pressure level. For example, the processor 310 may perform a first function when the sensed pressure value is a value corresponding to a section between a first pressure level and a second pressure level, and perform a second function different from the first function when the sensed pressure value is a value corresponding to a section between the second pressure level and the third pressure level.

Figure 22:
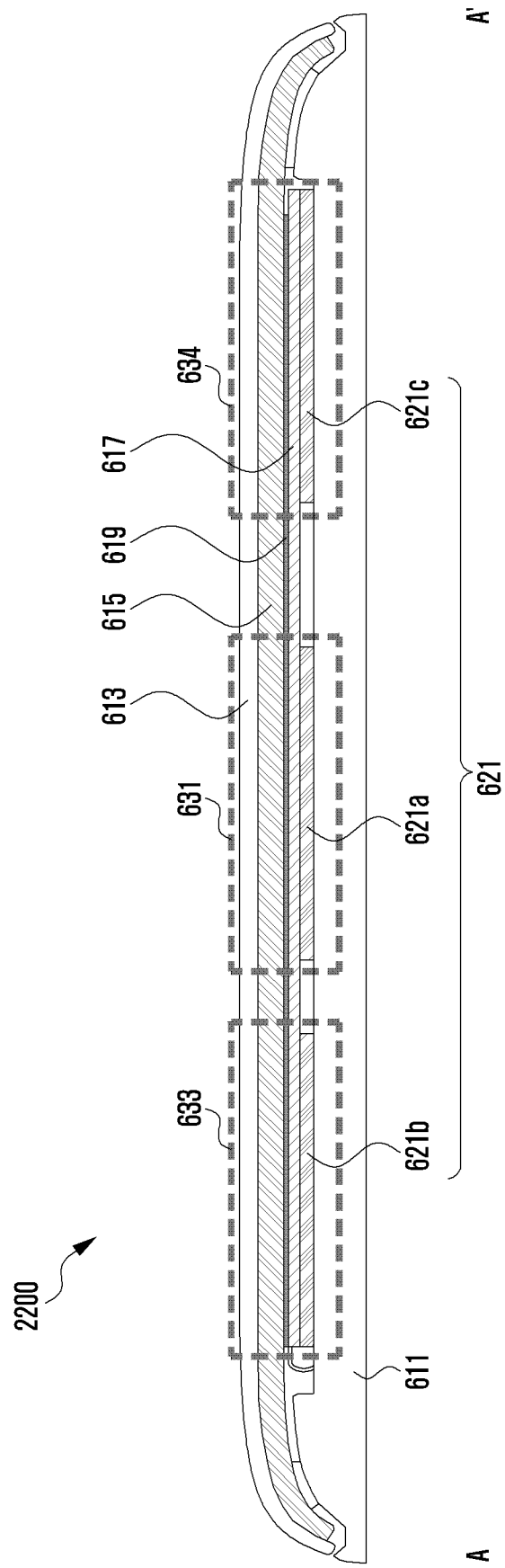
FIG. 22 is a cross-sectional view illustrating a portion of the electronic device according to another embodiment of the present disclosure.
Figure 23:
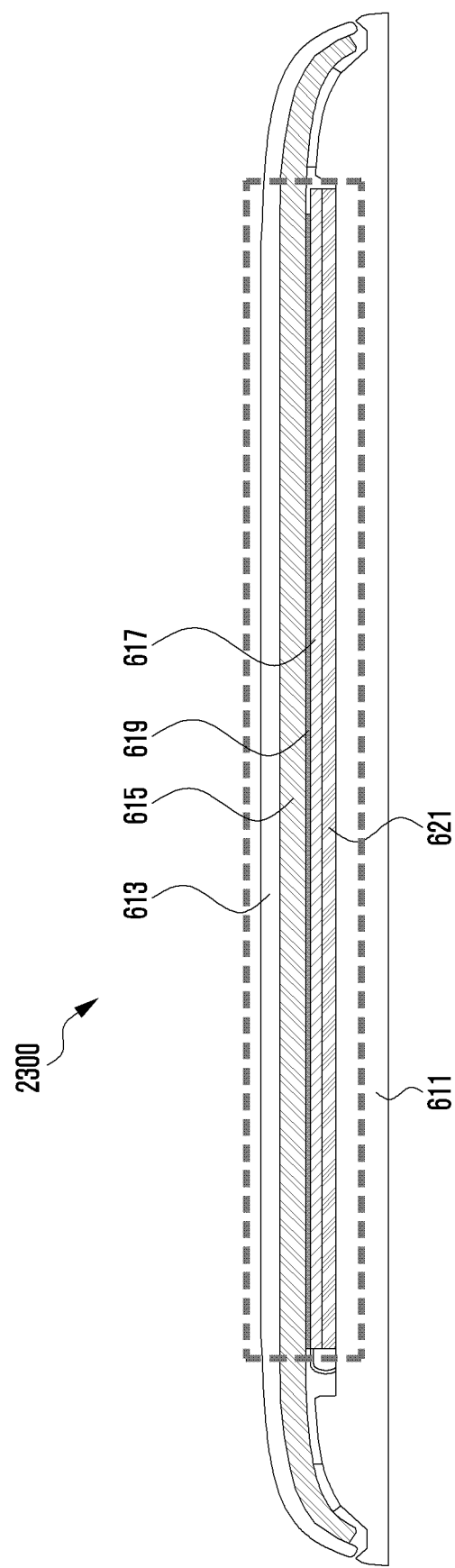
FIG. 23 is a cross-sectional view illustrating a portion of the electronic device according to another embodiment of the present disclosure.

FIG. 22 is a cross-sectional view illustrating a portion of the electronic device according to another embodiment of the present disclosure. FIG. 23 is a cross-sectional view illustrating a portion of the electronic device according to another embodiment of the present disclosure. Electronic devices 2200 and 2300 shown in FIGS. 22 and 23 may include the same or similar components as the electronic device 600 shown in FIG. 6. In the following description, only the portions different from the electronic device 600 of FIG. 6 will be described.

According to various embodiments, the elastic member can be arranged to correspond to a portion of the pressure sensor. For example, as illustrated in FIG. 22, in the electronic device 2200 according to another embodiment of the present disclosure, the elastic member 621 may include a first elastic member 621a disposed to overlap an intermediate part 631 of the pressure sensor 618 at which the first button (e.g., home button) of the electronic device 2200 is positioned, a second elastic member 621b disposed to overlap one part 633 of the pressure sensor 618 at which the second button (e.g., reverse button) of the electronic device 2200 is positioned, and a third elastic member 621c disposed to overlap the other part 634 of the pressure sensor 617 at which a third button (e.g., menu button) of the electronic device 2200 is positioned.

Alternatively, as illustrated in FIG. 23, the electronic device 2300 according to another embodiment may be arranged so that the elastic member 621 overlaps the entire area of the pressure sensor 617.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, alternatives, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments of the present disclosure have been illustrated and described with reference to the accompanying drawings, it will be understood that the various example embodiments are intended to be illustrative and not limiting. Various changes in form and details may be made without departing from the spirit and scope of the disclosure.

What is claimed is:

1. An electronic device, comprising:
a housing including a front plate, and a back plate facing a direction opposite the front plate;
a display panel interposed between the front plate and the back plate, and viewable through the front plate;
a mid-plate interposed between the display panel and the back plate;
a pressure sensor including a first conductive plate interposed between the display panel and the mid-plate, and a second conductive plate interposed between the first conductive plate and the mid-plate and spaced from the first conductive plate;
an elastic member comprising an elastic material interposed between the second conductive plate and the mid-plate, and attached to the mid-plate;
a processor disposed in the housing and electrically connected to the display panel and the pressure sensor; and
a memory disposed in the housing and electrically connected to the processor, wherein the memory stores instructions that, when executed by the processor, are configured to cause the electronic device to:
determine, via the pressure sensor, a pressure level while there is no external pressure against the front plate; and
adjust at least one threshold level for the electronic device to use when there is an external pressure against the front plate, based at least in part on the determined pressure level.

2. The device of claim 1, wherein the pressure sensor further includes an elastic layer comprising an elastic material interposed between the first conductive plate and the second conductive plate.

3. The device of claim 1, further comprising: an adhesive layer interposed between the display panel and the first conductive plate.

4. The device of claim 3, further comprising a flexible printed circuit board (FPCB) interposed between the elastic member and the second conductive plate.

5. The device of claim 4, wherein the FPCB extends from the display panel.

6. The device of claim 3, further comprising:
an FPCB interposed between the adhesive layer and the first conductive plate.

7. The device of claim 6, wherein the FPCB extends from the display panel.

8. The device of claim 1, wherein the elastic member includes a foam layer.

9. The device of claim 8, wherein the foam layer includes urethane.

10. The device of claim 1, wherein, the instructions, when executed by the processor, are further configured to cause the electronic device to:
display at least one graphic user interface (GUI), and
select the GUI and/or activate a function associated with the GUI, when the external pressure exceeds the at least one threshold.

11. The device of claim 10, wherein the GUI includes one or more of a button, a symbol, and/or an icon.

12. The device of claim 11, wherein the button includes a home button.

13. The device of claim 1, wherein the instructions, when executed by the processor, are further configured to cause the electronic device to:
determine whether a specified condition is satisfied, and
determine the pressure level when the specified condition is satisfied.

14. The device of claim 13, wherein the specified condition includes one or more of:
a period of time during which a user input is not received,
a specified time
a specified period, and/or
a connection to a charger.

15. The device of claim 1, wherein the instructions, when executed by the processor, are further configured to cause the electronic device to:
determine, as a reference value, the pressure level sensed using the pressure sensor while there is no external pressure against the front plate,
adjust a plurality of threshold values for determining a strength of the pressure as a plurality of pressure levels based on the reference value,
determine a pressure level corresponding to the sensed external pressure based on the plurality of adjusted threshold values when the external pressure against the front plate is sensed, and
perform a specified function based on the determined pressure level.

16. A method for sensing, by an electronic device, a pressure, the electronic device including a display panel interposed between a front plate and a back plate and exposed through the front plate, a mid-plate interposed between the display panel and the back plate, a pressure sensor including a first conductive plate interposed between the display panel and the mid-plate and a second conductive plate interposed between the first conductive plate and the mid-plate and spaced from the first conductive plate, and an elastic member comprising an elastic material interposed between the second conductive plate and the mid-plate and attached to the mid-plate, the method comprising:
determining a pressure level, using the pressure sensor while there is no external pressure against the front plate; and
adjusting at least one threshold level for the electronic device to use when there is an external pressure against the front plate, based at least in part on the determined pressure level.

17. The method of claim 16, further comprising:
displaying at least one graphic user interface (GUI), and
selecting the GUI and/or activating a function associated with the GUI, when the external pressure exceeds the at least one threshold.

18. The method of claim 16, further comprising:
determining whether a specified condition is satisfied; and
determining the pressure level when the specified condition is satisfied.

19. The method of claim 18, wherein the specified condition includes one or more of:
a period of time during which a user input is not received,
a specified time
a specified period, and/or a connection to a charger.

20. A non-transitory computer-readable recording medium having stored thereon instructions that, when executed by at least one processor of an electronic device, cause the electronic device to perform at least one operation, the electronic device including a display panel interposed between a front plate and a back plate and exposed through the front plate, a mid-plate interposed between the display panel and the rear plate, a pressure sensor including a first conductive plate interposed between the display panel and the mid-plate and a second conductive plate interposed between the first conductive plate and the mid-plate and spaced from the first conductive plate, an elastic member comprising an elastic material interposed between the second conductive plate and the mid-plate and attached to the mid-plate, and a processor electrically connected to the display panel and the pressure sensor, the at least one operation comprising:

determining, using the pressure sensor, a pressure level while there is no external pressure against the front plate; and adjusting at least one threshold level for the electronic device to use when there is an external pressure against the front plate, based at least in part on the determined pressure level.

* * * * *